US007516051B2

(12) United States Patent
Johnson et al.

(10) Patent No.: US 7,516,051 B2
(45) Date of Patent: Apr. 7, 2009

(54) OVERHEAD POWER TRANSMISSION LINE CONDUCTOR SELECTION

(75) Inventors: Douglas E. Johnson, Minneapolis, MN (US); Elisa J. Collins, Oakdale, MN (US); Anton F. Jachim, St. Paul, MN (US)

(73) Assignee: 3M Innovative Properties Company, Saint Paul, MN (US)

( * ) Notice: Subject to any disclaimer, the term of this patent is extended or adjusted under 35 U.S.C. 154(b) by 414 days.

(21) Appl. No.: 11/419,365

(22) Filed: May 19, 2006

(65) Prior Publication Data

US 2007/0271081 A1   Nov. 22, 2007

(51) Int. Cl.
*G06F 17/50* (2006.01)
*G01R 19/00* (2006.01)
(52) U.S. Cl. .................... 703/2; 703/17; 324/76.11
(58) Field of Classification Search .................. 703/2, 703/6, 17; 702/65; 385/147; 324/76.11; 700/286
See application file for complete search history.

(56) References Cited

U.S. PATENT DOCUMENTS

| 5,235,861 | A | 8/1993 | Seppa |
| 5,517,864 | A | 5/1996 | Seppa |
| 5,689,417 | A | 11/1997 | Shockley et al. |
| 5,933,355 | A | 8/1999 | Deb |
| 6,097,298 | A | 8/2000 | Brown |
| 6,304,838 | B1 | 10/2001 | Brown |
| 6,523,424 | B1 * | 2/2003 | Hayes et al. ............ 73/862.391 |
| 7,107,162 | B2 * | 9/2006 | Zima et al. ................... 702/65 |

2007/0009224 A1 * 1/2007 Browning .................. 385/147

OTHER PUBLICATIONS

Transmission and Distribution Committee, of the IEEE Power Engineering Society, "IEEE Standard for Calculating the Current-Temperature Relationship of Bare Overhead Conductors", Institute of Electrical and Electronics Engineers standard # 738, 1993, Calculation Module 23, IEEE Corporate Office.

Thrash et al, "Overhead Conductor Manual", Southwire Company Overhead Conductor Manual, First Edition 1994.

(Continued)

*Primary Examiner*—Thai Phan
(74) *Attorney, Agent, or Firm*—Steven A. Bern

(57) ABSTRACT

In general the invention is directed to systems and methods to identify conductors that may be used as part of a power transmission line system. In one embodiment, the invention is directed to a computer-implemented method of evaluating an electric conductor for an overhead power transmission line, comprising: receiving requirements data defining requirements for an overhead power transmission line; receiving conductor data that define at least two conductors to be evaluated; after receiving conductor data for the plurality of conductors to be evaluated, automatically modeling expected operating performance for at least two conductors using conductor assessment software running on a computer, wherein modeling at least comprises, for at least one of the conductors to be evaluated, calculating the conductor's maximum ampacity within the constraints defined by the requirements data; and, based on the modeling, identifying at least one conductor that meets the requirements for the power transmission line.

30 Claims, 20 Drawing Sheets

OTHER PUBLICATIONS

"A Method of Stress-Strain Testing of Aluminum Conductors and ACSR and A Method for Determining the Long Time Creep of Aluminum Conductors in Overhead Line", Aluminum Association Guide, Rev. 1999.

Kelly, D. K, and Jancauskas, J. R.; "Cable Sizing—Avoid Shortcuts and Do it Right", IEEE, 1996, pp. 2341-2346.

Kirshnasamy, S. G., Ford, G. L., and Orde, C. I.; "Predicting the Structural Performance of Transmission Lines Uprated by Reconductoring", IEEE Transactions on Power Apparatus and Systems, vol. PAS-100, No. 5, May 1981, pp. 2271-2277.

Chen, S.L., Black, W. Z., Loard, H. W. Jr.; "High Temperature Ampacity Model for Overhead Conductors", IEEE Transactions on Power Delivery, vol. 17, No. 4, Oct. 2002, pp. 1136-1141.

Chen, S.L., Black, W. Z., Loard, H. W. Jr.; "Closure on High Temperature Ampacity Model for Overhead Conductors", IEEE Transaction on Power Delivery, vol. 18, No. 2, Apr. 2003, pp. 647.

Chen, S.L., Black, W. Z., Fancher, M. L.; "High Temperature Sag Model for Overhead Conductors", IEEE Transaction on Power Delivery, vol. 18, No. 1, Jan. 2003, pp. 183-188.

Chen, S.L., Black, W. Z., Fancher, M. L.; "Closure on 'High Temperature Sag Model for Overhead Conductors'", IEEE Transaction on Power Delivery, vol. 18, No. 4, Oct. 2003. pp. 1600-1601.

Filipovic-Gledja, V., Morgan, V. T., and Findlay, R. D.; "A Unified Model for Predicting the Electrical, Mechanical and Thermal Characteristics of Stranded Overhead-Line Conductors", Department of Electrical and Computer Engineering, McMaster University, Hamilton, Ontario, Canada, pp. 182-185.

Morgan, V. T.; Discussion of "High Temperature Ampacity Model for Overhead Conductors", IEEE Transactions on Power Delivery, vol. 18, No. 2, Apr. 2003, pp. 646-647.

Morgan, V. T., Discussion of "High Temperature Sag Model for Overhead Conductors", IEEE Transaction on Power Delivery, vol. 18, No. 4, Oct. 2003. pp. 1600.

Peyrot, A. H.; "Microcomputer-Based Nonlinear Structural Analysis of Transmission Line Systems", IEEE Transactions on Power Apparatus and Systems, vol. PAS-104, No. 11, Nov. 1985, pp. 3236-3244.

Ringler, P.; "Automated Methods of Power-Line Design/Analysis", Transmission & Distribution, Oct. 1990, pp. 70-73.

Rodolakis, A. J.; "Point-and-Click Cable Ampacity Studies", IEEE, Apr. 1998, pp. 53-56.

PLS-CADD™ (Power Line Systems—Computer Aided Design and Drafting), PowerLine® Systems Inc., <http://www.powline.com/products/pls_cadd.html>, pp. 1-9 [retrieved from the internet on Mar. 15, 2006].

Pondera Engineers, LLC, "Products, Nip & Truck, Transmission Line Design and Engineering", <http://www.ponderaengineers.com/products/niptuck.asp>, [retrieved from the internet on Sep. 13, 2006].

Pondera Engineers, LLC, "Products, TLCADD, Transmission Line Design and Engineering", <http://www.ponderaengineers.com/products/tlcadd.asp>, [retrieved from the internet on Sep. 13, 2006].

Pondera Engineers, LLC, "Products, LD-DigiCAD—Transmission Line Design and Engineering", <http://www.ponderaengineers.com/products/ld-digicad.asp>, [retrieved from the internet on Sep. 13, 2006].

Pondera Engineers, LLC, "Products, PoleSTAR—3D Structure Analysis and Design", <http://www.ponderaengineers.com/products/polestar.asp>, [retrieved from the internet on Sep. 13, 2006].

RateKit Thermal Rating ToolKit, "Products, Ratekit Thermal Rating Toolkit, Ratekit Brochure", <http://www.cat-1.com/ratekit.html>, [retrieved from the internet on Sep. 5, 2006].

Pondera Engineers, "Products, TL-Pro Design Studio—Transmission Line Design and Engineering", <http://www.ponderaengineers.com/products/tl-pro_studio.asp>, [retrieved from the internet on Sep. 5, 2006].

* cited by examiner

OVERHEAD POWER TRANSMISSION LINE CONDUCTOR SELECTION

BACKGROUND

Electrical line system design, specifically the choice of a conductor to carry electrical current, is typically facilitated with two distinct sets of known calculations. Initially, a first computer program utilizes a first set of calculations to determine ampacity of a given conductor. Ampacity is a calculation of current carrying capacity for a conductor, given conductor temperature, and given a set of weather conditions.

Next, a second computer program computes sag and tension calculations for the transmission line. These calculations determine mechanical loads on the conductor, and other structures included in the transmission line system, under various weather conditions. The calculations also determine resulting conductor sag values. Typically, among the weather conditions evaluated, sag and tension values are calculated at the conductor temperature used for the ampacity calculation. This information is analyzed and used, for example, to determine the necessary height of towers that hold power lines.

Some software programs perform only one of these two calculations, while others perform both. Examples of such programs include that marketed by ACA Conductor Accessories, Spartanburg, S.C., under the trade designation "SAG10", or that marketed by Power Line Systems, Inc., of Madison, Wis., under the trade designation "PLS-CADD", or that marketed by Pondera Engineers, Spokane, Wash., under the trade designation "TL-PRO DESIGN STUDIO."

SUMMARY

In general, the invention is directed to computer-assisted systems and techniques for selecting a conductor given power transmission line requirements. For example, a computerized conductor assessment system is described that provides an interface with which a user or users interact and provide input defining various requirements of a power transmission system. In response to the input from a user, the computerized conductor assessment system automatically or semi-automatically produces electric conductor selection reports showing conductors that fall within the requirements of the power transmission system.

In one embodiment, the invention is directed to a computer-implemented method of evaluating an electric conductor for an overhead power transmission line, comprising: receiving requirements data defining requirements for an overhead power transmission line comprising at least a span value, a maximum sag value, and a maximum tension value; receiving conductor data that define at least two conductors to be evaluated; after receiving conductor data for the plurality of conductors to be evaluated, automatically modeling expected operating performance for at least two conductors using conductor assessment software running on a computer, wherein modeling at least comprises, for at least one of the conductors to be evaluated, calculating the conductor's maximum ampacity within the constraints defined by the requirements data; and, based on the modeling, identifying at least one conductor that meets the requirements for the power transmission line using the conductor assessment software.

In another embodiment, the invention is directed to a computer-implemented method of evaluating an electric conductor for an overhead power transmission line, comprising: receiving requirements data defining requirements for an overhead power transmission line comprising at least a span value, minimum ampacity, and a maximum tension value; receiving conductor data that define at least two conductors to be evaluated; after receiving conductor data for the plurality of conductors to be evaluated, automatically modeling expected operating performance for at least two conductors using conductor assessment software running on a computer, wherein modeling at least comprises, for at least one of the conductors to be evaluated, calculating the conductor's minimum sag within the constraints defined by the requirements data; and, based on the modeling, identifying at least one conductor that meets the requirements for the power transmission line using the conductor assessment software.

In another embodiment, the invention is directed to a computer-implemented method of evaluating an electric conductor for an overhead power transmission line, comprising: receiving power transmission line data that defines an existing power transmission line; receiving a set of requirements data defining requirements for a replacement conductor from a user, at least one limitation of which is proposed by the conductor assessment software, and based on a limitation of the existing power transmission line; receiving conductor data that define at least two conductors to be evaluated; after receiving conductor data for the plurality of conductors to be evaluated, automatically modeling expected operating performance for at least two conductors using conductor assessment software running on a computer; and, based on the modeling, identifying at least one conductor that meets the requirements for the power transmission line using the conductor assessment software.

In another embodiment, the invention is directed to a computer-implemented method of evaluating an electric conductor for an overhead power transmission line, comprising: receiving requirements data that define at least two requirements for an overhead power transmission line; receiving conductor data that define at least two conductors to be evaluated; receiving preference data that defines at least one design goal, wherein the design goal defines both "a" and "b" as follows: (a) a design goal variable, which is any variable that is among the requirements data, among the conductor data, among both the requirements data and the conductor data, or is the result of a calculation that involves data that is either among the requirements data or the conductor data, (b) for the design goal variable and data defining whether the variable should be maximized or minimized; after receiving requirements data, conductor data, and preference data, for the plurality of conductors to be evaluated, automatically modeling expected operating performance for at least two conductors using conductor assessment software running on a computer; and, based on the modeling, identifying at least one conductor that meet the requirements for the power transmission line, and either maximizes or minimizes the design goal variable as defined by the preference data using the conductor assessment software.

In another embodiment, the invention is directed to a system for identifying conductors that meet requirements for an overhead power transmission line, comprising: a database component operative to maintain a database identifying at least two conductors; a user interface component operative to receive information defining requirements for an overhead power transmission line, the requirements at least comprising a span value, a maximum sag value, and a maximum tension value; a modeling component operative to computationally evaluate the performance of at least two of the conductors maintained in the database component, wherein computational evaluation comprises calculating a conductor's maximum ampacity with the constraints defined by the requirements data; and a reporting component operative to determine, based on the modeling component's evaluation, conductors that meet requirements for the overhead power transmission line.

In another embodiment, the invention is directed to a method of selling a conductor for an overhead power transmission line comprising: receiving requirements for an overhead power transmission line; identifying a set of conductors that could meet the requirements of a power transmission line, at least two of the conductors from different manufacturers; using a computer-implemented method to automatically model performance of at least two of the conductors against requirements of the power transmission line; generating a list of conductors that meet the requirements; and selling a conductor from the list of conductors that meet the requirements.

In another embodiment, the invention is directed to a computer-readable medium having computer-executable instructions for performing a method of evaluating an electric conductor for an overhead power transmission line, comprising: receiving requirements data defining requirements for an overhead power transmission line comprising at least a span value, a maximum sag value, and a maximum tension value; receiving conductor data that define at least two conductors to be evaluated; after receiving conductor data for the plurality of conductors to be evaluated, automatically modeling expected operating performance for at least two conductors using conductor assessment software running on a computer, wherein modeling at least comprises, for at least one of the conductors to be evaluated, calculating the conductor's maximum ampacity within the constraints defined by the requirements data; and, based on the modeling, identifying at least one conductor that meets the requirements for the power transmission line using the conductor assessment software.

In another embodiment, the invention is directed to a computer-readable medium having computer-executable instructions for performing a method of evaluating an electric conductor for an overhead power transmission line, comprising: receiving requirements data defining requirements for an overhead power transmission line comprising at least a span value, minimum ampacity, and a maximum tension value; receiving conductor data that define at least two conductors to be evaluated; after receiving conductor data for the plurality of conductors to be evaluated, automatically modeling expected operating performance for at least two conductors using conductor assessment software running on a computer, wherein modeling at least comprises, for at least one of the conductors to be evaluated, calculating the conductor's minimum sag within the constraints defined by the requirements data; and, based on the modeling, identifying at least one conductor that meets the requirements for the power transmission line using the conductor assessment software.

In another embodiment, the invention is directed to a computer-readable medium having computer-executable instructions for performing a method of evaluating an electric conductor for an overhead power transmission line, comprising: receiving power transmission line data that defines an existing power transmission line; receiving a set of requirements data defining requirements for a replacement conductor from a user, at least one limitation of which is proposed by the conductor assessment software, and based on a limitation of the existing power transmission line; receiving conductor data that define at least two conductors to be evaluated; after receiving conductor data for the plurality of conductors to be evaluated, automatically modeling expected operating performance for at least two conductors using conductor assessment software running on a computer; and, based on the modeling, identifying at least one conductor that meets the requirements for the power transmission line using the conductor assessment software.

In another embodiment, the invention is directed to a computer-readable medium having computer-executable instructions for performing a method of evaluating an electric conductor for an overhead power transmission line, comprising: receiving requirements data that define at least two requirements for an overhead power transmission line; receiving conductor data that define at least two conductors to be evaluated; receiving preference data that defines at least one design goal, wherein the design goal defines both "a" and "b" as follows: (a) a design goal variable, which is any variable that is among the requirements data, among the conductor data, among both the requirements data and the conductor data, or is the result of a calculation that involves data that is either among the requirements data or the conductor data, (b) for the design goal variable and data defining whether the variable should be maximized or minimized; after receiving requirements data, conductor data, and preference data, for the plurality of conductors to be evaluated, automatically modeling expected operating performance for at least two conductors using conductor assessment software running on a computer; and, based on the modeling, identifying at least one conductor that meet the requirements for the power transmission line, and either maximizes or minimizes the design goal variable as defined by the preference data using the conductor assessment software.

In another embodiment, the invention is directed to a method of evaluating an electric conductor for an overhead power transmission line, comprising: a user accessing a computer; running on the computer a conductor modeling program that computes operational characteristics of a plurality of conductors; prompting the user for requirements data that define at least one requirement for an overhead transmission line; while the conductor modeling program is running, iteratively performing for at least two conductors, (a) accessing a database that defines at least two conductors to retrieve conductor information that defines one conductor, and (b) computing operational characteristics of the conductor; comparing at least one operational characteristic of each conductor against at least one requirement for the overhead power transmission line; and, based on the comparison, presenting to the user at least one conductor that has an operational characteristic that meets a requirement for the overhead power transmission line.

The details of one or more embodiments of the invention are set forth in the accompanying drawings and the description below. Features, objects, and advantages of the invention will be apparent from the description and drawings, and from the claims.

BRIEF DESCRIPTION OF DRAWINGS

FIG. 13 through FIG. 20 are screenshots of an exemplary implementation a computerized conductor assessment system.

DETAILED DESCRIPTION

A power transmission line system broadly encompasses the components between an electricity supply source and the electricity destination. One component of a power transmission line system is an electrical conductor. Typically, the electrical conductor is a stranded overhead power transfer medium comprised of a plurality of wires twisted together. Other components of a power transmission line system include the structures (e.g., transmission towers and distribution poles) that hold the conductors elevated, and devices that insulate the conductor.

Figure 1:
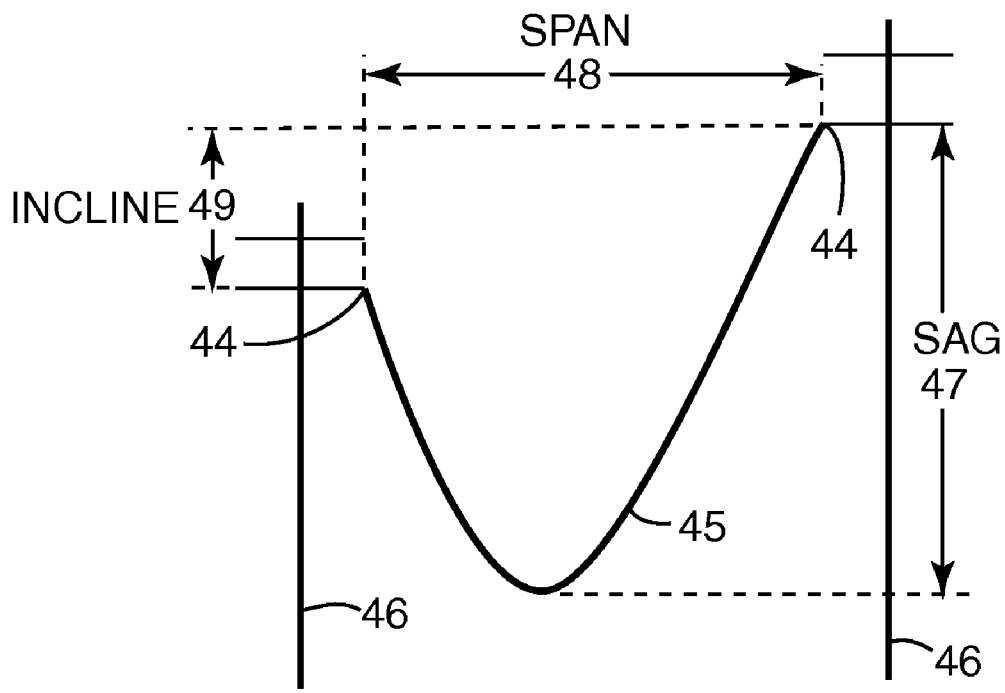
FIG. 1 is a schematic diagram of a conductor as part of a power transmission line system.

Referring to FIG. 1, a portion of a power transmission line system is shown to include conductor 45, a first and second transmission pole 46. The system has a span 48, a sag 47, and an incline 49. Span refers to the horizontal distance between the conductor's attachment points 44 on poles 46, without consideration to changes in elevation between poles. Sag refers to the distance between the right attachment point to the lowest point conductor 45 reaches within the span. Incline refers to the absolute vertical distance between mount points on two poles with positive values increasing from left to right.

Figure 2:
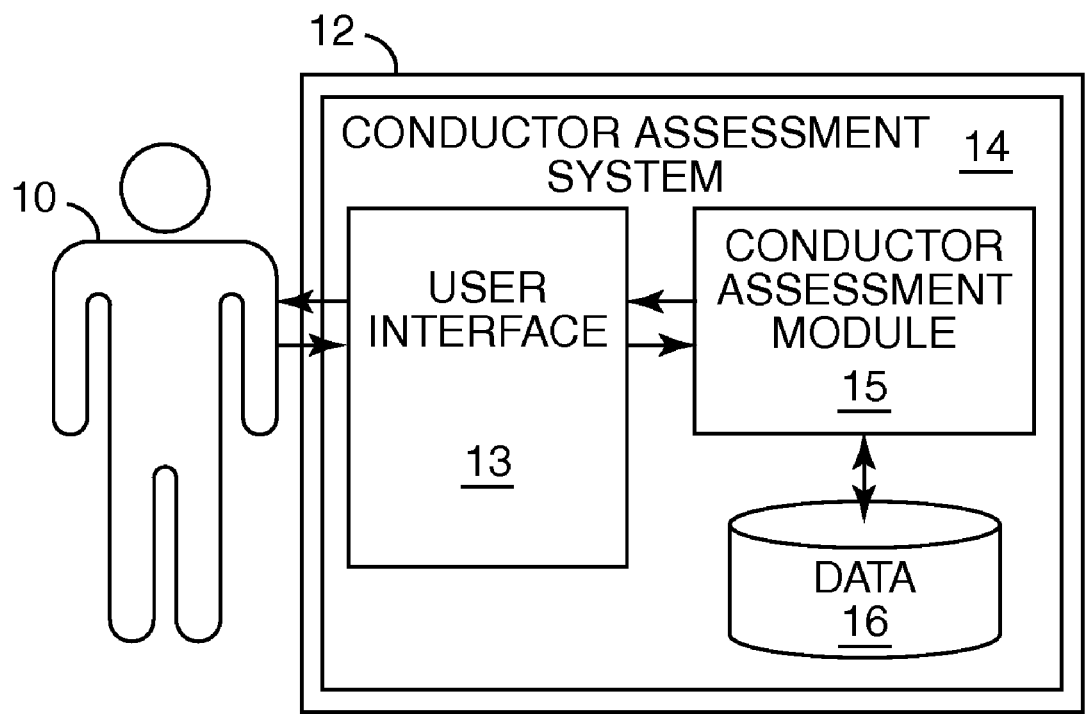
FIG. 2 is a block diagram illustrating a high-level view of an exemplary computerized conductor assessment system.

Referring to FIG. 2, exemplary conductor assessment system 14 includes conductor assessment module 15 which implements conductor assessment software that may allow user 10 to model and evaluate conductors against power transmission line requirements. Requirements may also be referred to as constraints. In one example, computing device 12 provides an operating environment for conductor assessment system 14 that, in one embodiment, allows user 10 to automatically or semi-automatically evaluate conductors used on power transmission lines and determine which conductors meet operating requirements for that power transmission line, wherein "automatically" means without substantial user input (i.e., a user would not need to load or otherwise define a subsequent conductor after a first conductor had been evaluated). Semi-automatically refers to embodiments wherein certain user input is solicited during the evaluation of conductors by conductor assessment system 14, but the input does not define further conductors per se (it may identify further conductors already loaded, however). For example, one embodiment may have intermediate breakpoints in the conductor evaluation routine where the system solicits feedback from the user as to whether the system should continue with its evaluation. In another embodiment, conductor assessment system 14 allows user 10 to specify one or more design goals, which are used by conductor assessment system 14 to prioritize the set of conductors that meet operating requirements, and in certain embodiments identify installation tensions and operating temperatures. In one embodiment, design goals are hard-coded into the system and it is not necessary for user 10 to specify them. Conductor assessment system 14 need not be implemented in a single computing device. Rather, in further embodiments, various modules, user interfaces, and data of conductor assessment system 14 exist on different servers or computing devices, connected in part by the Internet. Particularly, user interface 13 may be presented to user 10 via a web server over the World Wide Web, while the conductor assessment module 15 and data 16 is on a centralized server.

Again referring to FIG. 2, conductor assessment system 14 includes user interface 13 that facilitates presenting information to, and receiving information from, user 10. User interface 13 may take any form of user interface. In one embodiment, the user interface is a graphical user interface (GUI), and may comprise, for example, various windows, control bars, menus, switches, radio buttons, or other mechanisms that facilitate presentation and reception of data 16 and interaction with user 10. One common exemplary user interface is provided by the from Microsoft Corporation of Redmond, Wash. under the trade designation "WINDOWS OPERATING SYSTEM." Although described in various embodiments with respect to direct user interaction, user 10 may also remotely access conductor assessment system 14, or conductor assessment module 15, via a client device. For example, user interface 13 may be a web interface presented to a remote client device executing a web browser or other suitable networking software. Moreover, although described with respect to user 10, conductor assessment module 15 may be invoked by a software agent or another computer or device programmed to interact with user interface 13. Additionally, in one embodiment, the conductor assessment system may be invoked and utilized without a GUI, via an application programming interface (API) provided by the computerized conductor assessment system 14.

User 10 may be any individual, company, power utility, or party who has an interest in using conductor assessment system 14 to understand what conductors may be used on a power transmission line. In one embodiment, user 10 is an employee of a manufacturing company that produces conductors suitable for power transmission line applications. In this embodiment, user 10 may use conductor assessment system 14 to demonstrate that its conductors are particularly well suited, compared with other conductors, for a given application. In another embodiment, user 10 is a power company, utility, or other entity that makes decisions, or aids in making decisions, regarding power lines. In such an embodiment, user 10 may use conductor assessment 14 to understand which conductors could be used given various line requirements. In another embodiment, user 10 is a third party that sells or assists in selling conductors.

In one embodiment, conductor assessment system 14 receives information from user 10 via user interface 13. This information may include data defining application-specific power transmission line requirements, data defining an existing power transmission line, data defining conductors to be evaluated, data defining environmental scenarios the conductor should be modeled within, or data defining one or more design goals conductor assessment system 14 should consider when evaluating conductors for a power transmission line. Data defining an existing power transmission line may include size, stranding, core fraction, diameter, resistivity, strength, a compressive stress parameter for the conductor's outer strands, compressive strain, associated stress/strain curves, ruling span, actual span, incline, and a number of ampacity conditions including ambient temperature, wind velocity, wind angle, emissivity, solar absorption, conductor elevation, conductor direction, latitude, total solar flux, sun time (time of day for solar radiation calculations), and atmosphere. Data defining power transmission line requirements may be derived from the data describing the existing line, or may be a subset of the data describing the power transmission line. For example, data defining power transmission line requirements may include: maximum conductor diameter, maximum actual span sag, minimum emergency ampacity, maximum horizontal tension overall, maximum tension overall, maximum vertical tension overall, maximum horizontal tension at install, transverse tension, and maximum tension at install. Transverse tension is the force imposed on a conductor, usually by wind, transverse to the transmission line direction. Additionally, various power transmission line requirements may be specified as associated with one or more environmental scenarios. An environmental scenario is data that defines an environmental condition the power transmission line should be evaluated in consideration of. Often these scenarios represent weather extremes the power transmission line may encounter, as well as the environmental conditions at the time of installation. Environmental scenarios are defined by data such as ambient temperature, thickness of ice buildup, wind pressure, and National Electrical Safety Code overload factor K. Each environmental scenario, then, may have with it its own set of power transmission line requirements. For example, a first environmental scenario may describe blizzard conditions with heavy ice buildup and wind. Line requirements, in terms of maximum horizontal tension, maximum tension, and maximum vertical tension may, be specifically associated with this environmental scenario.

Information not input by user 10 is provided by data 16 or another data source. In one embodiment, data 16 includes data libraries that define various conductors to be evaluated as well as information that describes stress versus strain curves and associated information for the various conductors. In one embodiment, the various conductors may be theoretical. In another embodiment, the various conductors are commercially available conductors. In this embodiment, user 10 provides, via user interface 13, information defining line requirements, existing line parameters (which may be used as line requirements in various scenarios, such as when the conductor is being evaluated as a replacement line), data defining one or more environmental scenarios, and data defining design goals. In other embodiments several of the data described may be derived or are not necessary. For example, depending on how conductor assessment system is configured, it may not be necessary to provide design goals.

Regardless the origin of the inputs, either by data 16, user 10 via user interface 13, or otherwise, conductor assessment system 14 models conductors in the context of the power transmission line requirements and determines which conductors meet the power transmission line requirements. In one embodiment, conductor assessment system takes user-provided design goals into account when determining the conductors that meet power transmission line requirements. In another embodiment, conductors that meet the power transmission line requirements are presented to user 10 via user interface 13. These conductors may be sorted and presented in a manner consistent with the design requirements.

In another embodiment, conductors that meet the power transmission line requirements, along with install tension and operating temperature, are saved to a database for later analysis. In yet another embodiment, all information defining all conductors that were evaluated may be presented to user 10 or put into a database for later analysis. In another embodiment, an electronic report is generated that contains the conductors that meet the power transmission line requirements. This electronic report is optionally provided to a customer or potential customer.

Computing device 12 typically includes hardware (not shown in FIG. 2) that may include one or more processors, volatile memory (RAM), a device for reading computer-readable media, and input/output devices, such as a display, a keyboard, and a pointing device. Computing device 12 may be, for example, a workstation, a laptop, a personal digital assistant (PDA), a server, a mainframe or any other general-purpose or application-specific computing device. Although not shown, computing device 12 may also include other software, firmware, or combinations thereof, such as an operating system and other application software. Computing device 12 may read executable software instructions from a computer-readable medium (such as a hard drive, a CD-ROM, or a computer memory), or may receive instructions from another source logically connected to computer, such as another networked computer. Moreover, conductor assessment system 14 may be distributed to execute on multiple computers, and may be located remote to user 10 and accessible via a web browser or other interface.

Figure 3:
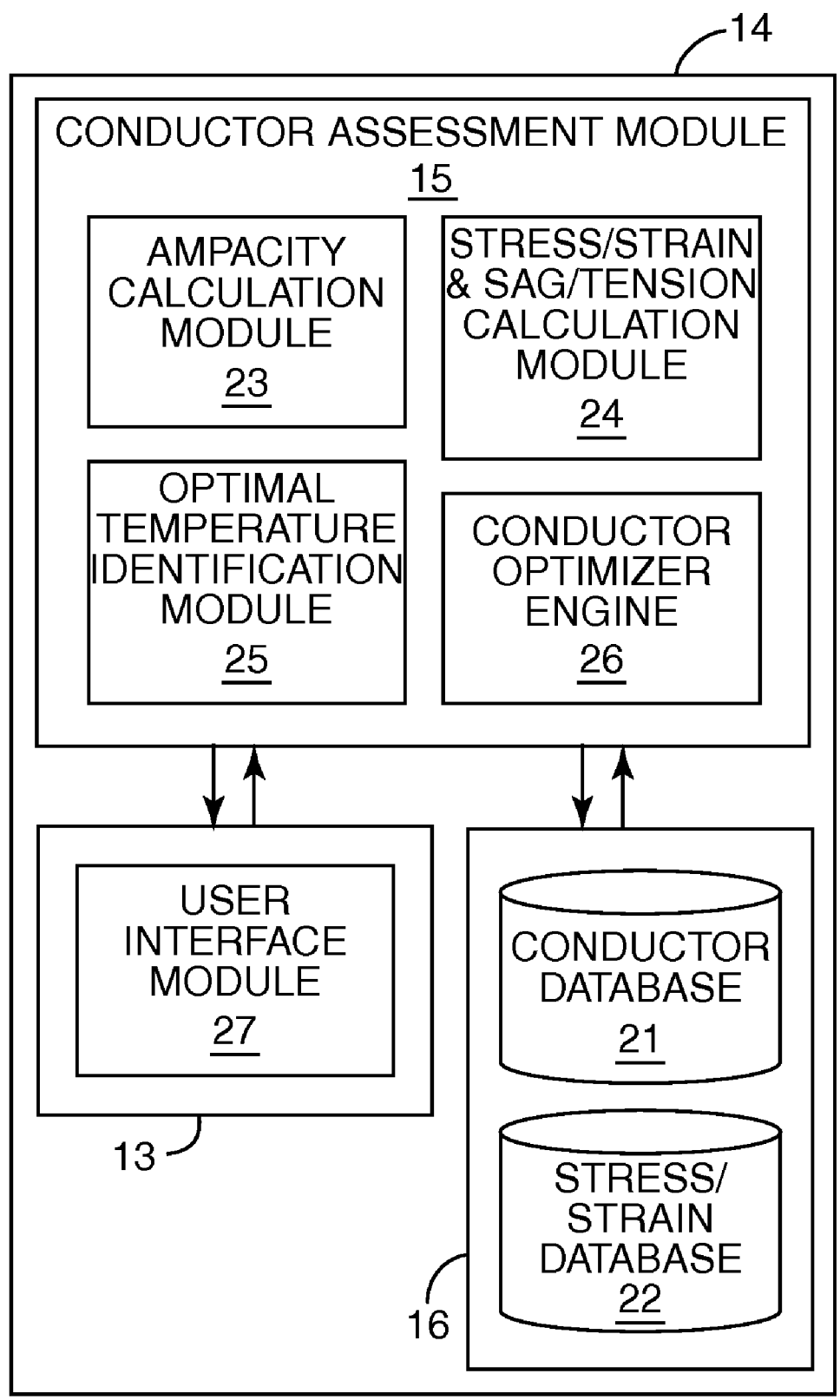
FIG. 3 is a block diagram illustrating software modules in an exemplary computerized conductor assessment system.

Conductor assessment system 14 may be implemented in a variety of ways. FIG. 3 is a diagram showing one exemplary implementation. Conductor assessment system 14 in this example is comprised of various modules, engines, and databases. It will be understood that features and functionality not specifically ascribed to a sub-module exist generally within user interface conductor assessment module 15, user interface 13, or data 16. It will further be understood that one skilled in the art will recognize different ways to implement and design a system that combines various modules or breaks certain modules into sub-modules or different modules. The details of implementation described herein are non-limiting.

In one embodiment, ampacity calculation module 23 calculates ampacity by a method described in Institute of Electrical and Electronics Engineers standard #738-1993, available from IEEE Corporate Office, 3 Park Avenue, 17th Floor, New York, N.Y. 10016-5997 U.S.A. or on the IEEE website, http://www.ieee.org (as of May 5, 2006), the disclosure of which is hereby incorporated by reference.

Stress/strain & sag/tension calculation module 24 calculates sag of a line given a conductor's physical properties, and stress-strain behavior. In one embodiment, stress/strain & sag/tension calculations utilize a method described in Overhead Conductor Manual, Southwire Company, 1994, the disclosure of which is herein incorporated by reference. Chen, S. Z., Black, W. A., Loard, H. W. Jr., "High Temperature Sag Model for Overhead Conductors," IEEE Transaction on Power Delivery, Vol. 17, No. 4, October 2002 describes a method combining ampacity and line sag calculations, and has a disclosure that is hereby incorporated by reference.

Conductor optimizer engine 26 may invoke various instances of the modules just described as well as other subroutines described further herein, to evaluate conductors given, depending on the particular implementation, power transmission line requirements, environmental scenarios, and/or design goals. In one example implementation described further herein, the conductor optimizer engine iterates through a series of loops and invokes modules as necessary. Various routines and subroutines executed by conductor optimizer engine 26 are described in further detail with respect to FIG. 5 through FIG. 11.

In the exemplary implementation represented by FIG. 3 data 16 includes conductor database 21 and stress/strain database 22. Data 16, and its constituent databases, may be implemented in a variety of forms including data storage files, computer memory, or one or more database management systems (DBMS) executing on one or more database servers. The database management system may be a relational (RDBMS), hierarchical (HDBMS), multidimensional (MDBMS), object oriented (ODBMS or OODBMS) or object relational (ORDBMS) database management system. Data 16 could, for example, be stored within a single relational database such as SQL Server from Microsoft corporation. In one embodiment, data 16 is a flat file loaded into memory of computing device 12. In another embodiment, data 16, and particularly conductor database 21 is loaded into computing device 12's memory.

Conductor database 21, in one embodiment, holds data defining conductors and operating parameters of conductors. In particular, conductor database 21 contains the exemplary data noted in Table 1 for each conductor that conductor assessment system 14 will evaluate:

TABLE 1

| Data description | Example |
|---|---|
| name of conductor | ACCR |
| overall diameter (inches) | 0.7239 |
| kind of conductor (conductor family) | ACCR |
| number of outer aluminum strands | 22 |
| number of reinforcing strands | 7 |
| aluminum wire diameter (inches) | 0.1278 |
| reinforcing wire diameter (inches) | 0.071 |
| rated strength (lbs) | 11084 |
| stress strain curve | 3477 |
| weight (lbs/ft) | 0.381 |
| resistance at 20 degrees celsius (ohms/mile) | 0.2497 |
| heat capacity core, w-s (ft.-degree Fahrenheit) | 5.9 |
| heat capacity outer aluminum, w-s (ft.-degree Fahrenheit) | 143.3 |

Stress strain database 22 in one embodiment contains stress strain information for every stress strain curve cross-referenced in the conductor database. For example, using the exemplary data in Table 1, the particular conductor has stress strain curve of 3477. This number is used to look up further information in the stress strain database. The stress strain database generally contains a list of polynomials, core fractions, and thermal elongation properties for a stress strain curve. Stress strain curve information in this database is available from conductor manufacturers, and is usually determined via a well known process, an implementation of which is described in Aluminum Association Guide, Rev. 1999, "A Method of Stress-Strain Testing of Aluminum Conductors and ACSR and A Method for Determining the Long Time Creep of Aluminum Conductors in Overhead Line." The particular information contained in the stress strain database in one exemplary embodiment is as represented in Table 2:

TABLE 2

| Data Descriptor | Example |
|---|---|
| stress strain curve number | 3477 |
| fmodel | 0.14 |
| test temp | 21.67 |
| Ai0 | 17 |
| Ai1 | 53996 |
| Ai2 | −10455 |
| Ai3 | −148929 |
| Ai4 | 165944 |
| A final modulus | 75865 |
| Af0 | 0 |
| Af1 | 25963 |
| Af2 | −3374 |
| Af3 | 135876 |
| Af4 | −292137 |
| Acte | 0 |
| Ri0 | −131 |
| Ri1 | 53268 |
| Ri2 | −55226 |
| Ri3 | 120092 |
| Ri4 | −85520 |
| R final modulus | 46093 |
| Rf0 | −131 |
| Rf1 | 53268 |
| Rf2 | −55226 |
| Rf3 | 120092 |
| Rf4 | −85520 |
| modulus aluminum | 8960710 |
| modulus core | 54100000 |
| CTE aluminum | 0.000023 |
| CTE core | 0.00000635 |

Ai0 is the zeroth order coefficient to the aluminum stress strain curve for initial loading (i.e. "A" stands for aluminum, "I" stands for initial loading, and "0" stands for zeroth order). Likewise, Rf3 is the third order coefficient for the reinforcing core, for final loading.

In one embodiment, described curves will be used by conductor assessment system 14 to solve a nested set of 4th order polynomials for each conductor and environmental condition. One nonlinear solution process is described in "Overhead Conductor Manual," Southwire Company, 1994, the disclosure of which is hereby incorporated by reference.

Figure 4:
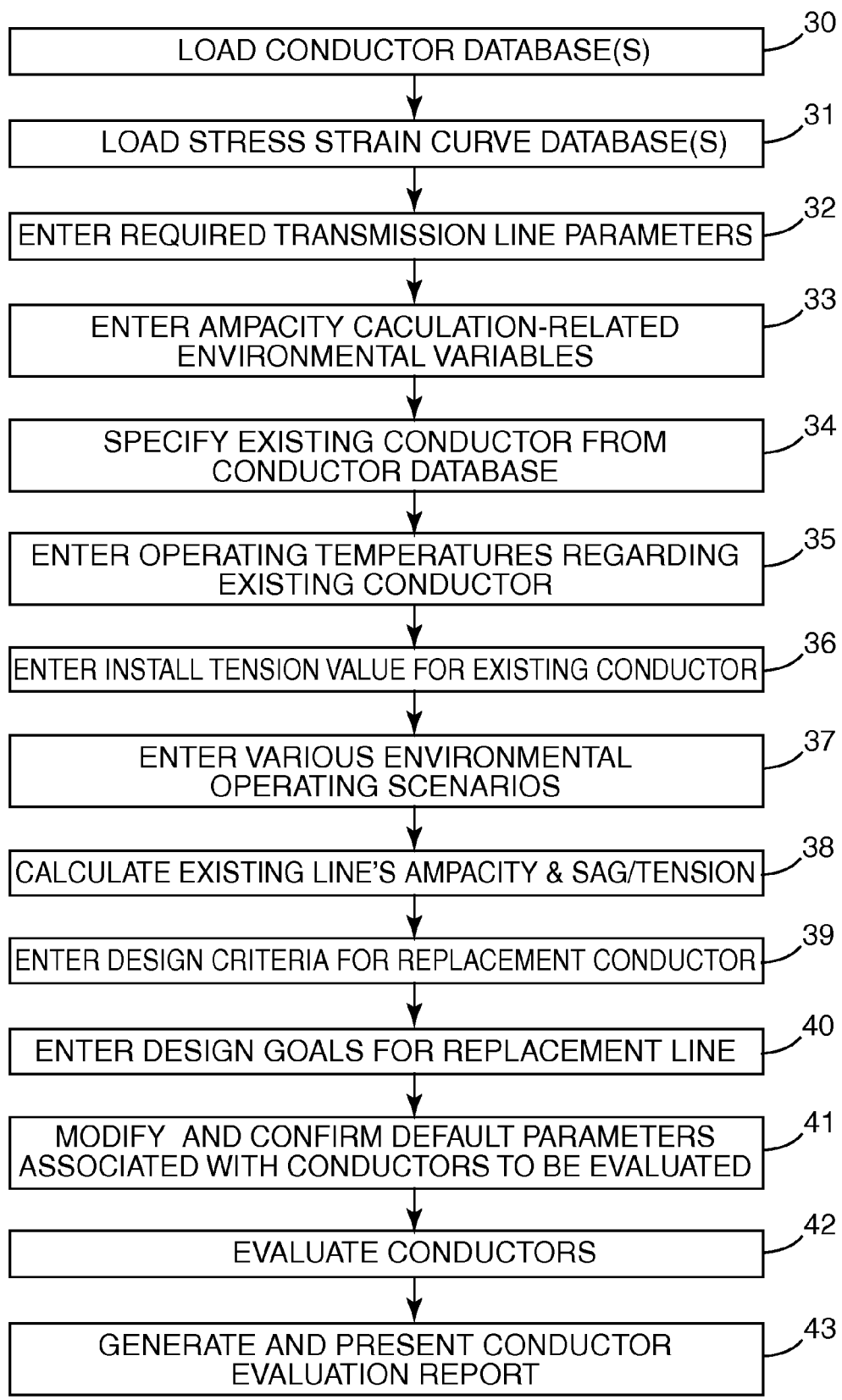
FIG. 4 is a flowchart illustrating an exemplary manner in which an embodiment of the computerized conductor assessment system may be used.

FIG. 4 is a flowchart showing high-level operation of a computer-program embodiment of conductor assessment system 14 and associated methods. Data is loaded into conductor database 21 upon starting conductor assessment system 14, which in one embodiment is a computer program (30). In one embodiment, this loading is accomplished by reading a flat file containing conductor data into a memory of computing device 12. In one embodiment, user 10 may be solicited for information defining the location of the flat file that contains the conductor data. In an alternative embodiment wherein the database is, for example, a relational database, this step could be omitted, or could instead be an initialization step wherein conductor data is validated and partially loaded into memory (e.g., perhaps only certain classes of conductors are loaded). User 10 may choose to load a subset of available conductor data, if, for example, user 10 is only interested in analyzing certain conductors but not others. The stress strain data is loaded into the stress/strain database 22 (31) in a manner similar to the loading of the conductor database 21.

Figure 13:
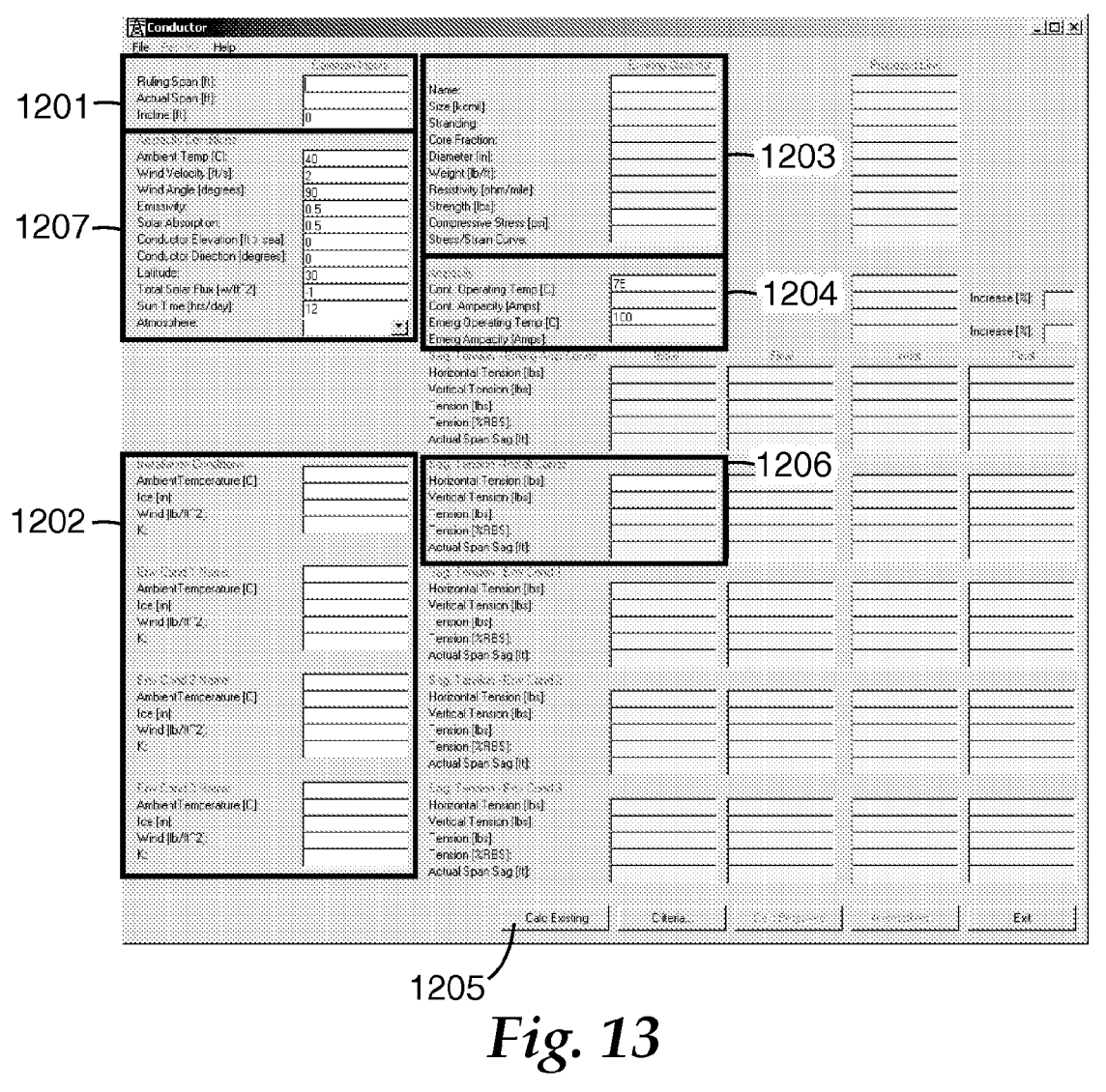

User 10 is then presented with user interface 13 facilitating the entry of information defining required transmission line parameters (32). In one embodiment, user interface 13 is a screen as presented in FIG. 13. FIG. 13 is an exemplary screenshot showing a user interface that may be used to gather transmission line parameter information from user 10. Common inputs 1201 define transmission line parameters ruling span, actual span, and incline. The ruling span for a tension section can be calculated by the following equation:

$$\text{ruling span} = \sqrt{\frac{\sum_{\# \text{ of spans}} \text{span}^3}{\sum_{\# \text{ of spans}} \text{span}}}$$

Actual span is a physical span within a tension section for which the ruling span was calculated. Sag values are calculated based on the actual span. Incline, an optional parameter, is used if the actual span is not level. Incline is, in one embodiment, measured from left to right as shown in FIG. 1.

User 10 then enters ampacity-related environmental variables as exemplified in FIG. 13, ampacity rating-related environmental variables 1207 (33). Ampacity-related environmental variables 1207 generally define the weather conditions for calculating conductor 45's emergency ampacity. If a negative number is input for total solar flux, the conductor assessment system 14 will automatically calculate solar flux based on the other inputs.

User 10 then enters information about the user's existing conductor, as exemplified in FIG. 13, existing conductor-related input area 1203 (34). Only the text entry boxes relative to name and compressive stress may be entered by user 10. Other variables in existing conductor-related input area 1203 are looked up in conductor database 21 or derived. In one embodiment the name of the conductor must be the name of a conductor in conductor database 21. In another embodiment, user 10 may select from various conductors available in conductor database 21, or specify a theoretical conductor. Compressive stress refers to the maximum compressive stress that the outer aluminum strands of the conductor can support as the conductor expands.

User 10 then enters operating temperatures regarding the existing conductor, as was previously defined by user 10 (35). FIG. 13's conductor operating temperatures area 1204 illustrates how user interface 13 may facilitate gathering this information. Only two inputs are needed from user 10 with regard to conductor's operating temperatures area 1204. In one embodiment, the first input is the conductor's continuous operating temperature (maximum), and the second is the conductor's emergency operating temperature. These values are sometimes supplied by the utility company or by the conductor manufacturer. Continuous temperature is used to calculate the ampacity of the existing conductor. Sag, as will be seen, is not calculated using continuous operating temperature. Emergency operating temperature will be used to calculate both emergency ampacity and emergency sag. If user 10 is interested in modeling a conductor based on continuous ampacity and sag, the continuous temperature value should be entered also as the emergency temperature.

User 10 then enters install tension value for the existing conductor (36). This is exemplified in FIG. 13, install condition entry area 1206. In this embodiment, user 10 need only enter tension (horizontal) under installation conditions; the remaining fields in install condition entry area 1206 will be calculated.

User 10 then enters data defining various environmental scenarios (37). An embodiment of this step is in FIG. 12's environmental condition entry area 1202. This step, like many here, is optional depending on the assumptions the system is programmed to make.

Figure 15:
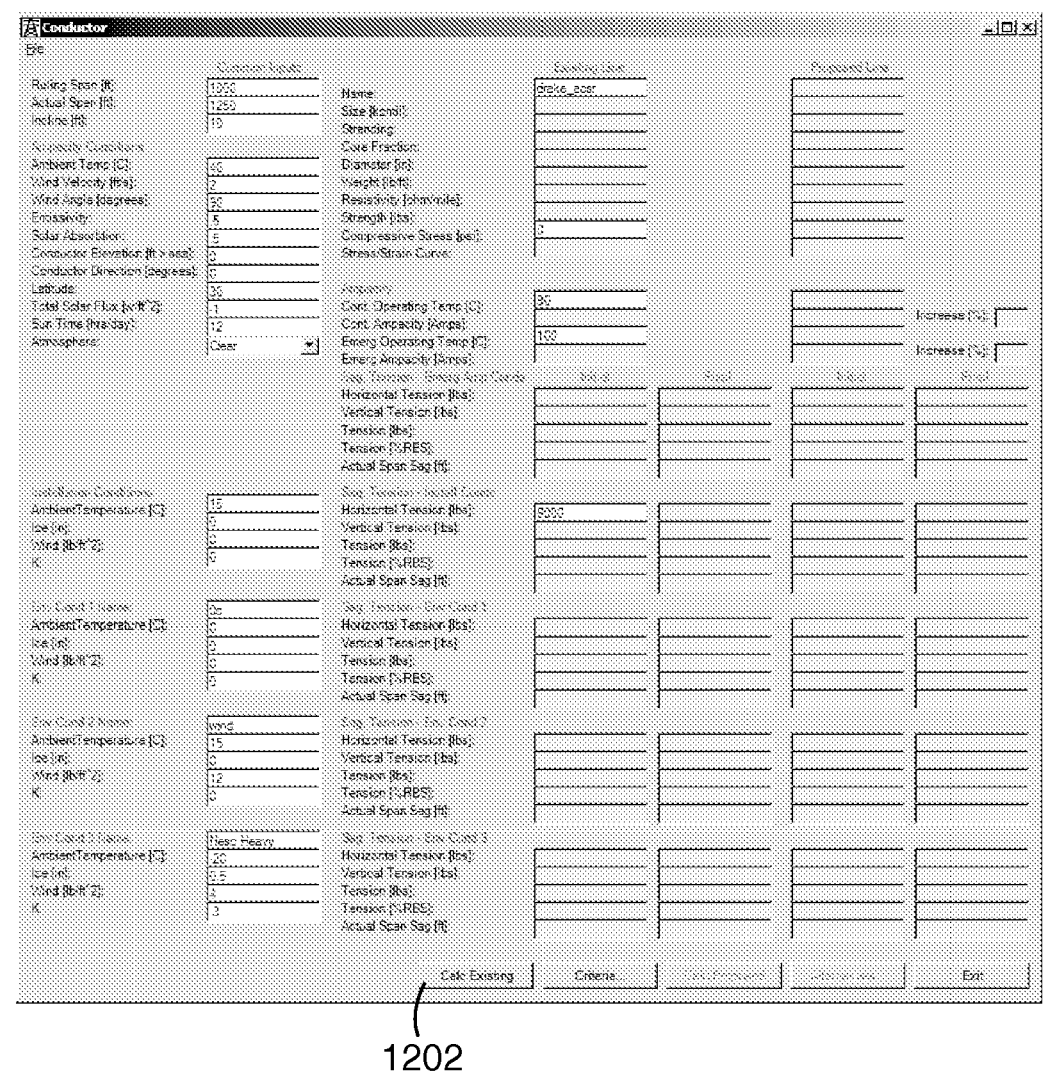
Figure 16:
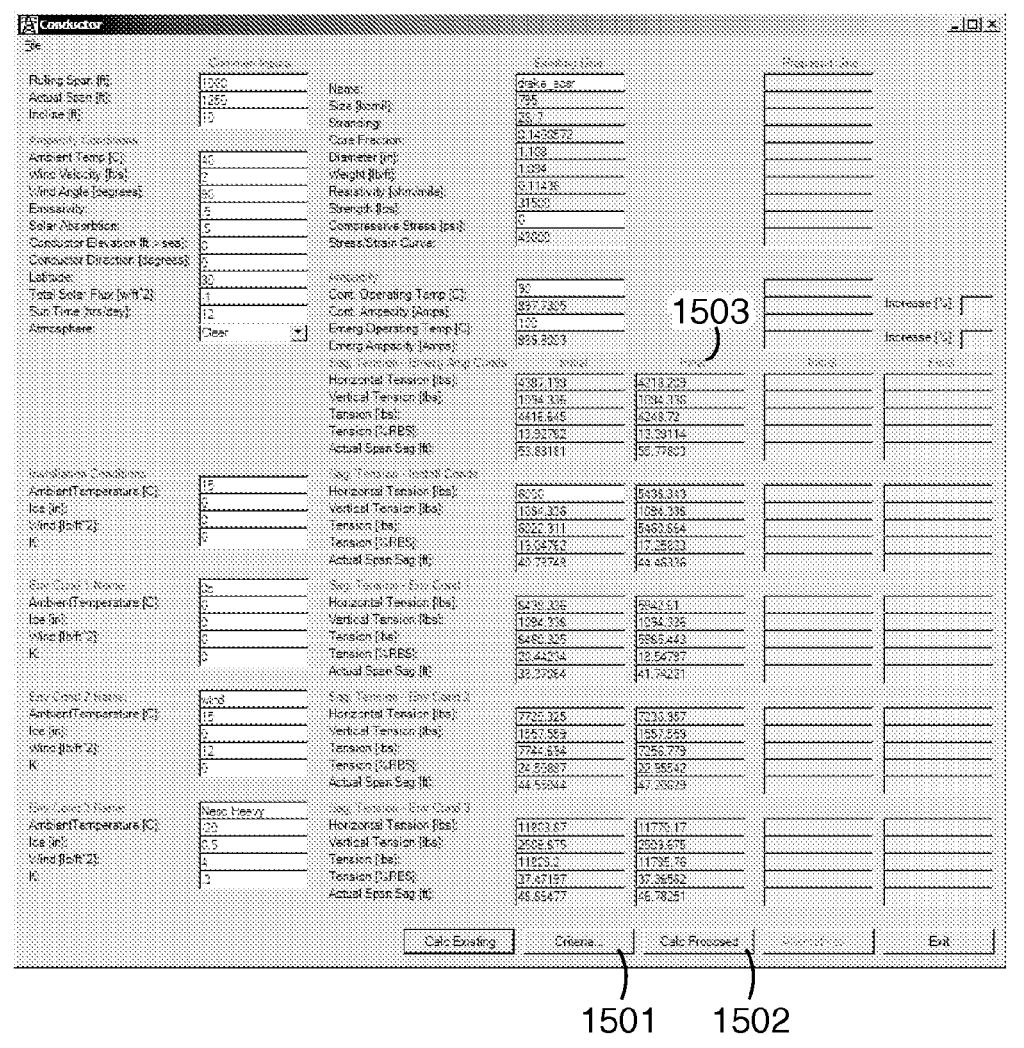

When information available has been entered, user 10 presses calc existing button 1205, and remaining information is calculated, including in particular the existing line's ampacity as well as sag/tension for each environmental scenario (38). FIG. 15 is an exemplary screen shot in which various data has been entered as would have been done per the preceding steps. FIG. 15 shows a screen shot just before user 10 presses the calc existing button 1205. FIG. 16 is an exemplary screenshot presented to user after user 10 has pressed calc existing button 1205. If an incline value was specified, the sag values displayed are calculated from the right attachment point, as shown in FIG. 1. Existing conductor section final column 1503 in FIG. 16 is a calculation of ampacity and environmental scenario sag values after 10 years of creep from the install condition or after plastic elongation due to the heaviest weather load, whichever produces the most elongation.

Figure 14:
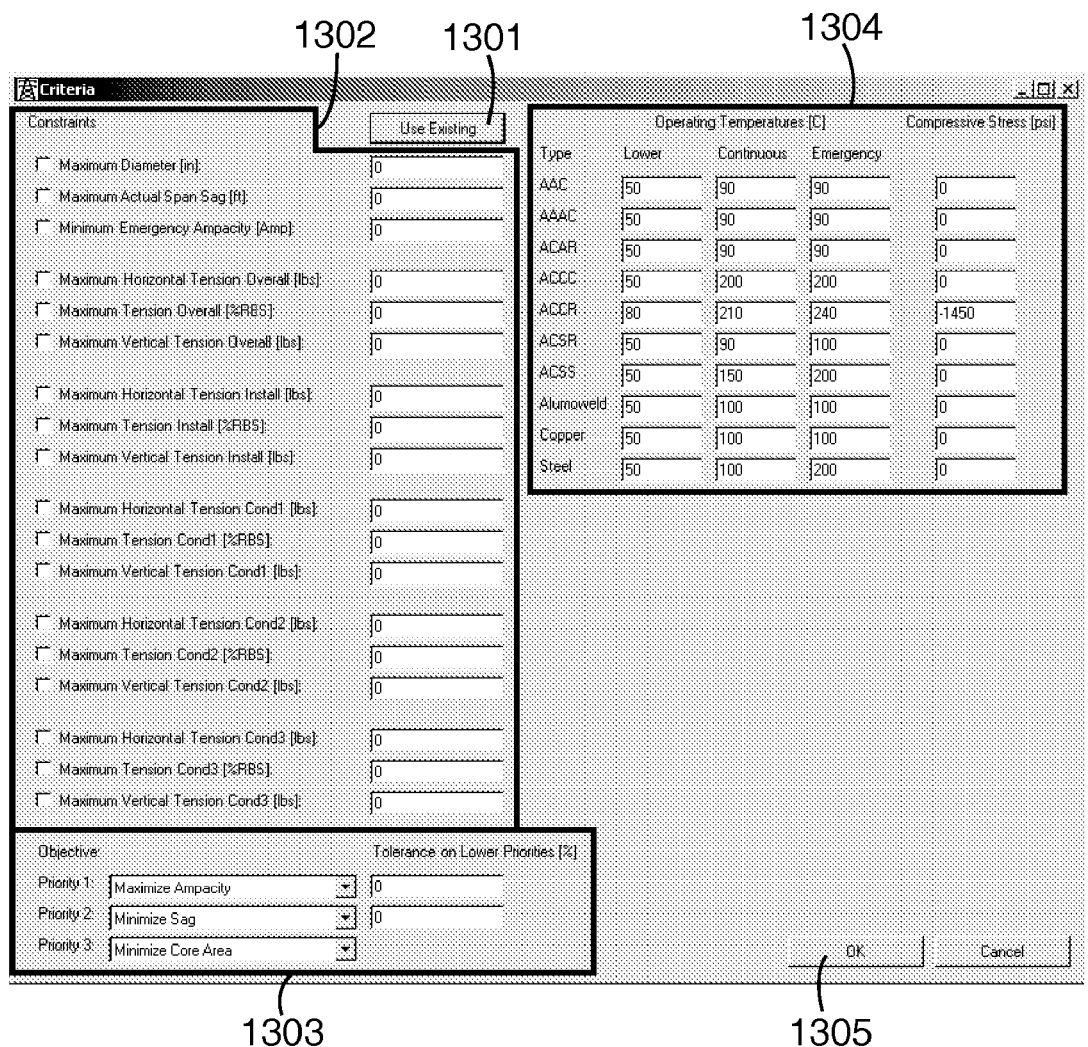
Figure 17:
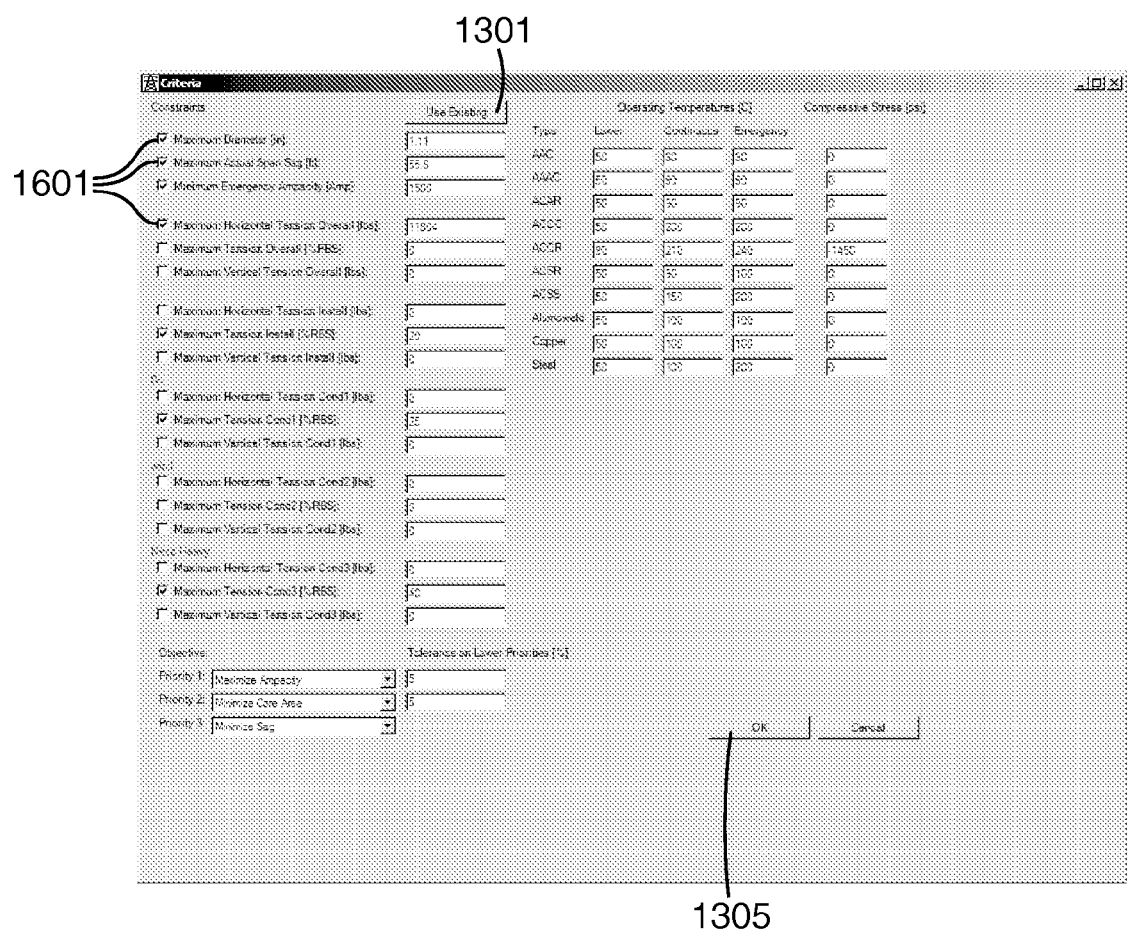

User may then proceed to enter data defining design criteria for the new conductor (39). This is done by pressing criteria button 1501 as shown in FIG. 16. FIG. 14 is an exemplary screenshot showing conductor constraint information entry area 1302 in which user 10 may specify data defining design criteria for the new conductor. User may press use existing button 1301 to have values imported into conductor constraint information entry area 1302 from the ampacity and sag/tension calculations computed for the existing conductor and each environmental scenario. FIG. 17 is a screenshot showing user interface 13 after user 10 has depressed use existing button 1301. User may then place a check next to those particular conductor constraints/design criteria that are of interest to user 10, as exemplified in FIG. 17 with conductor constraint criteria check boxes 1601. User 10 may modify any of the variables in the conductor constraint information entry area 1301. In one embodiment, any proposed conductor will be required by conductor assessment system 14 to comply with all of the constraints which have a criteria check box 1601 that is checked. In another embodiment at least one limitation or design constraint is proposed by the conductor assessment software.

Next, user 10 specifies design goals, or design objectives, for the new conductor (40). User may specify the design goals by populating the design goal area 1303 as exemplified with respect to FIG. 14. In one embodiment, the conductor assessment system is set up to choose conductors with three main goals which user 10 may prioritize: increase ampacity, decrease sag, and reduce core area. "Increase ampacity" and "decrease sag" are often driven by customer technical requirements. Core area refers to the total area of the reinforcing core wires of a conductor. It may be economical to minimize core area; thus, an objective may be to minimize this core component. In one embodiment, the first priority ("priority 1") is set to user 10's first priority in accordance with the user 10's upgrade objective. Conductor assessment system 14 will iterate through all conductors described in conductor database 21 and identify the conductors that best meet this objective.

Associated with the first two priorities are text entry areas in a column entitled "Tolerances on Lower Priorities (%)". Conductor assessment system 14 uses values user 10 enters into the priority 1 tolerance area to identify solutions that are within the specified percent tolerance of the best priority 1 solution, while solving for user 10's second design priority. Likewise, in one embodiment, conductor assessment system 14 will identify the conductor that best meets the third priority which is also within the tolerance value associated with the first priority solution and the tolerance value associated with the second priority solution.

For example, if the first priority is set to ampacity, conductor assessment system 14 will seek the highest ampacity conductor otherwise meeting the constraints entered into conductor constraint information entry area 1302. Perhaps conductor assessment system 14 identifies a particular conductor that has an emergency ampacity of 2000 amps, a maximum sag of 40 feet, and a core area of 0.2 square inch. If the first priority tolerance on lower priorities is set to 5%, and the second priority set to sag, then conductor assessment system 14 will seek the conductor with the least sag, which can provide at least 1900 amps (2000×(1−0.05)). Particularly, conductor assessment system 14 may identify a conductor which provides 1920 amps, has a core area of 0.23 square inch, but only sags 36 feet. If, however, second priority's tolerance on lower priorities is also 5%, conductor assessment system 14 will seek to optimize the third objective, minimal area, while maintaining at least 1900 amps, and at most 37.8 feet (36×(1+0.05)) of sag. Conductor assessment system 14 may identify a conductor capable of producing 1905 amps, with 37.5 ft of sag, with a core of only 0.18 square inch.

Next, user 10 may modify default parameters associated with various conductor families (41). Default conductor family modification area 1304, as exemplified in FIG. 14, shows one way in which this data may be input by user 10. The column labeled "type" refers to the name of the conductor family. A conductor family is a defined by the conductor's construction. For example, AAC refers to an all aluminum conductor. ACCR refers to aluminum conductor composite reinforced. ACSR refers to aluminum conductor steel reinforced. The column labeled "lower" refers to the operating temperature user 10 would like conductor assessment system 14 to use as the lowest practical wire temperature under emergency operating conditions. It will be at this "lower" temperature that conductor assessment system 14 will start searching for an emergency temperature for a given family of conductors. In one embodiment, by default the lower limit for all conductors is set to 50° C. The column labeled "continuous" refers to the continuous temperature used to calculate continuous ampacity for proposed conductors. Sag is not calculated by conductor assessment system 14 for the continuous temperature. The column labeled "emergency" refers to maximum allowable temperatures for the conductor family. The column labeled "compressive stress (psi)" refers to the maximum compressive stress that the outer strands of a conductor can sustain under compression. For many conductor families this value is assumed to be zero. Compressive stress values should be entered as negative numbers.

Information input or defined in default conductor family modification area 1304 and conductor constraint information entry area 1302 is considered the transmission line requirements. Information input or defined with respect to design goal area 1303 is considered the design goals.

Once user 10 has entered various data as shown on FIG. 17, user 10 presses OK button 1305 and returns to the first user interface screen, in the state it was in prior to entering design criteria, except calc proposed box 1502 in FIG. 16 is no longer grayed-out, signaling to user 10 that the system has at least the minimum necessary inputs, in one embodiment, to begin assessing conductors.

User 10 next clicks calc proposed button 1502 in FIG. 16 to start conductor assessment system 14's evaluation of conductors (42). Each conductor in conductor database 21 is reviewed in light of the power transmission line requirements and in consideration of the design goals. In one embodiment, the process is automatic and the user need not supply more data describing subsequent conductors. The process for this evaluation is described in further detail in FIG. 5 through FIG. 11.

Figures 18, 19:
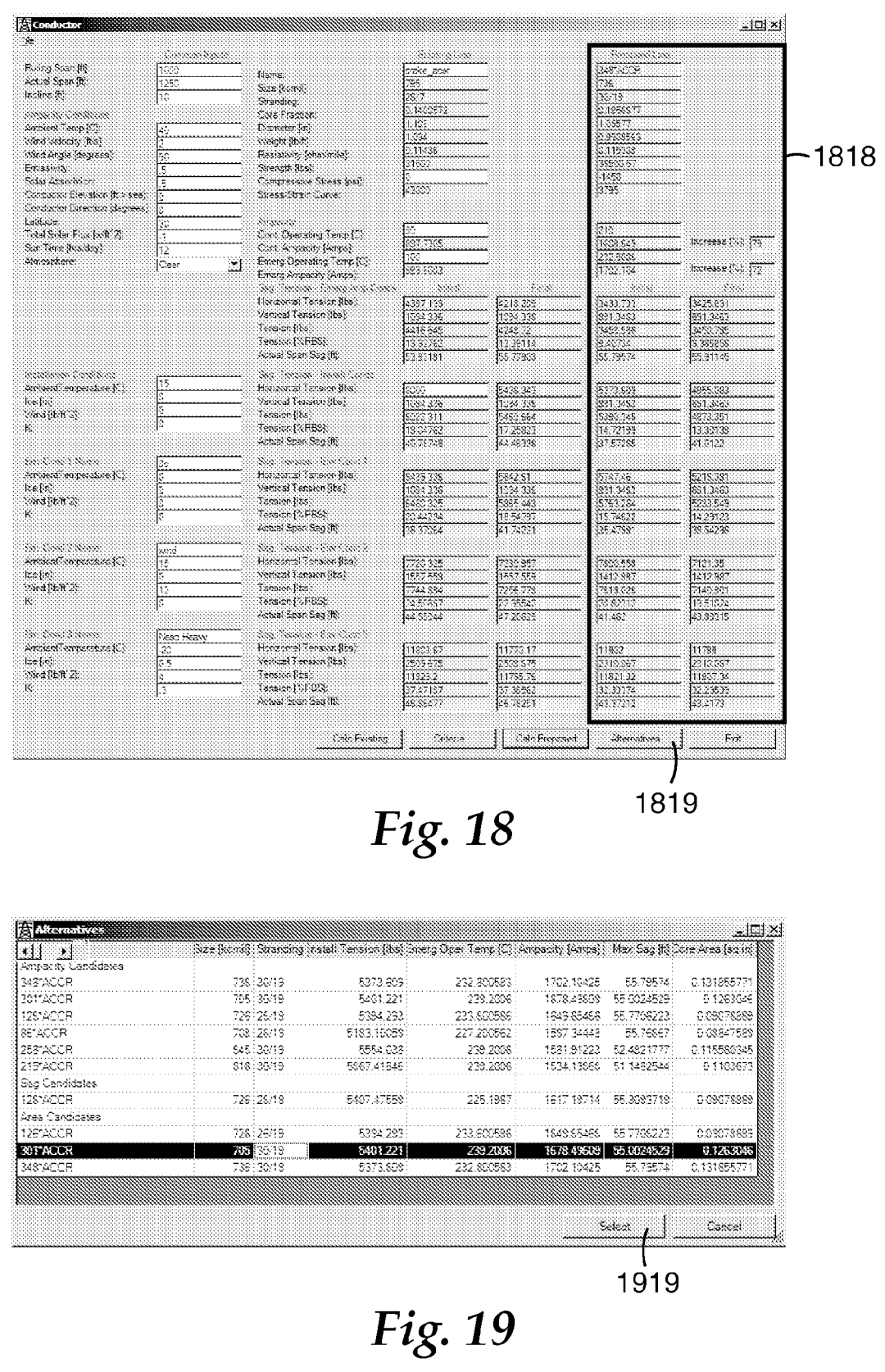

When conductor assessment system 14 has completed its assessment of conductors, it presents to user 10, via user interface 13, information showing the conductors that meet the power transmission line requirements and design goals (43). In another embodiment, the information showing the conductors that meet the power transmission line requirements and design goals are printed to paper via a printer. Conveying resulting conductor information to user 10 may take many forms. In one embodiment, a single best conductor is presented to user 10 on a first screen. An example of such a scenario is shown in FIG. 18. Proposed conductor area 1818 shows details of the proposed conductor, the ampacity calculations for the conductor, and sag calculations in the various environmental conditions. Additionally, the column entitled "final" shows similar calculations after expected conductor elongation either due to 10 years of operation at install tension, or due to a heavy load condition, whichever causes more elongation.

The optimal, or best, conductor that conductor assessment system 14 suggests may not be the most desirable solution. Conductor assessment system 14 also calculated and saved every conductor in the database that met user 10's power transmission line requirements, ranked by design goal. In one embodiment, these alternatives may be reviewed by user 10 clicking alternatives button 1819, as exemplified in FIG. 18. FIG. 19 shows an exemplary screen shot listing alternative conductors. Conductors listed in FIG. 19 are categorized and sorted by the design priority used to calculate them. The ampacity solutions are the conductors selected while conductor assessment system 14 was optimizing for ampacity, and they are sorted by ampacity (more is better). The sag solutions were calculated while conductor assessment system 14 was optimizing for sag and these are organized by sag (less is better). And the area solutions were calculated while conductor assessment system 14 was looking for the conductor with the least core area, and they are sorted by core area (less is better). User 10 may highlight any listed conductor and press select button 1919 to bring the conductor onto the main screen, proposed conductor area 1818, as exemplified in FIG. 18.

User 10 may then print or otherwise export the analysis results to paper or electronic files for later review. User 10 may also save the details of an existing line, power transmission line requirements, and design goals. In one embodiment, user 10 may also save the results of the conductor analysis.

FIG. 4, up to this point, has been discussed mostly in general. The following is a more particular example of how a user could use one embodiment of the system. For the purposes of this example, assume a utility customer wishes to upgrade the conductor used on an existing power transmission line. User has collected information from the utility customer about its existing power transmission line, as well as other requirements for a replacement conductor. In this example, user 10 loads into conductor database 21 data defining ACSR, ACSS, and ACCR conductors (30). The stress/strain curve database is then loaded (31). Data collected from the utility is then input into conductor assessment system 14 (32) as follows.

The transmission line used in the example has a ruling span of 1000 feet. Along the tension section with this ruling span, there is a span of 1250 feet. As a conductor heats up and expands, the utility customer expects that this span will be the first to reach the clearance limit. Also, on this 1250 foot span, the left attachment point is 50 ft higher than the right point. These inputs may be entered into common inputs area 1201 as shown on FIG. 13 (33).

These values, generally termed ampacity-related environmental variables are entered (33) based on, in this example, the following data, as specified by the customer: (i) ambient temperature 40° C., (ii) wind speed 2 feet/s, (iii) the wind blows at 90° to the transmission line, (iv) emmissivity and absorbtivity are assumed to be 0.5, (v) the conductor is at 1000 ft above sea level, (vi) the conductor's orientation is north-south, and the conductor is at 30° latitude, (vii) the sun is at the twelve o'clock position, and (viii) the conductor is located in an uncontaminated atmosphere.

User 10 then specifies that the existing conductor is an ACSR "Drake" (34), which is looked up in the conductor database to retrieve further information about the conductor.

Transmission line parameters are then entered for the existing conductor (35). In this example, the Drake is rated by the utility customer for 90° C. operation, but in an emergency, it can be run as hot as 100° C. The horizontal install tension for the existing conductor (36) is entered as 6000 pounds.

The utility customer then specifies three weather scenarios be considered when calculating conductor mechanical loads (37): (i) 0° C. with no wind or ice, (ii) 15° C. with 12 lbs/sq. ft. of wind, and (iii) National Electrical Safety code "Heavy", which includes, −20° C., 0.5" of ice, 4 lbs/sq. ft. and an overload of 0.3 lbs/ft ("K" within the user interface). The utility customer has assumed that the aluminum in the existing ACSR "Drake" conductor does not support compressive stress.

Next, User calculates sag, tension, and ampacity values for the existing ACSR "Drake" conductor by selecting the "Calc Exiting" button 1202 on FIG. 15 (38).

The user then enters design criteria for the replacement conductor (39). In this case, the utility customer requires that any upgrade conductor not impose higher horizontal tension on the towers than the existing conductor. The upgrade conductor must be of equal or smaller diameter than the existing conductor, so not to exceed existing transverse wind loading. The conductor must be installed at less than 20% of its rated breaking strength. The conductor must not exceed 25% of its rated breaking strength at 0° C. with no wind or ice. Finally, the customer specifies that the upgrade conductor must not exceed the sag of the existing conductor at maximum operating temperature. The utility customer is interested in solutions that will provide ampacity ratings of greater than 1500 amps.

Next, the design goals are entered (40) as maximum diameter of 1.11 inches, maximum actual span of 55.8 feet, minimum emergency ampacity of 1,500 amps, maximum horizontal tension of 11,804 pounds, maximum tension condition 1 of 25% rated break strength, and maximum tension condition 3 of 40% rated break strength. Next, the User specifies default operating temperature ranges and aluminum compressive stress parameters for ACSR, ACSS, and ACCR conductor families.

Then the User then presses the "OK" button 1305 on FIG. 17 and is returned to the initial screen, where the User presses "Calc Proposed" button 1502 on FIG. 16, whereby the conductors are evaluated (42). Based on the objective selections on the previous criteria screen, conductor assessment system 14 determines which conductors in the selected database meet the utility customer's specified requirements, and each conductor's maximum ampacity rating of each. Conductor assessment system 14 then sorts the results to identify the conductor with the most ampacity. Conductor assessment system 14 then automatically sets the required ampacity to 95% of the maximum attained. This effectively overrides the user's selection of minimum emergency ampacity made earlier. Conductor assessment system 14 then iterates through the selected database, or set, of conductors with this new ampacity requirement, identifying all conductors which can attain at least 95% of maximum ampacity. Conductor assessment system 14 then, in one embodiment, sorts these results to identify the conductor or conductors with at least 95% maximum ampacity and the minimum core area. Conductor assessment system 14 then automatically sets an internal constraint that the maximum allowable core area is 105% of the minimum value identified. Conductor assessment system 14 then iterates through the selected database of conductors, identifying the conductors which can attain 95% of maximum ampacity, have less than 105% of the minimum core area previously identified, and the minimum sag for each. These procedures are explained further below.

Figure 20:
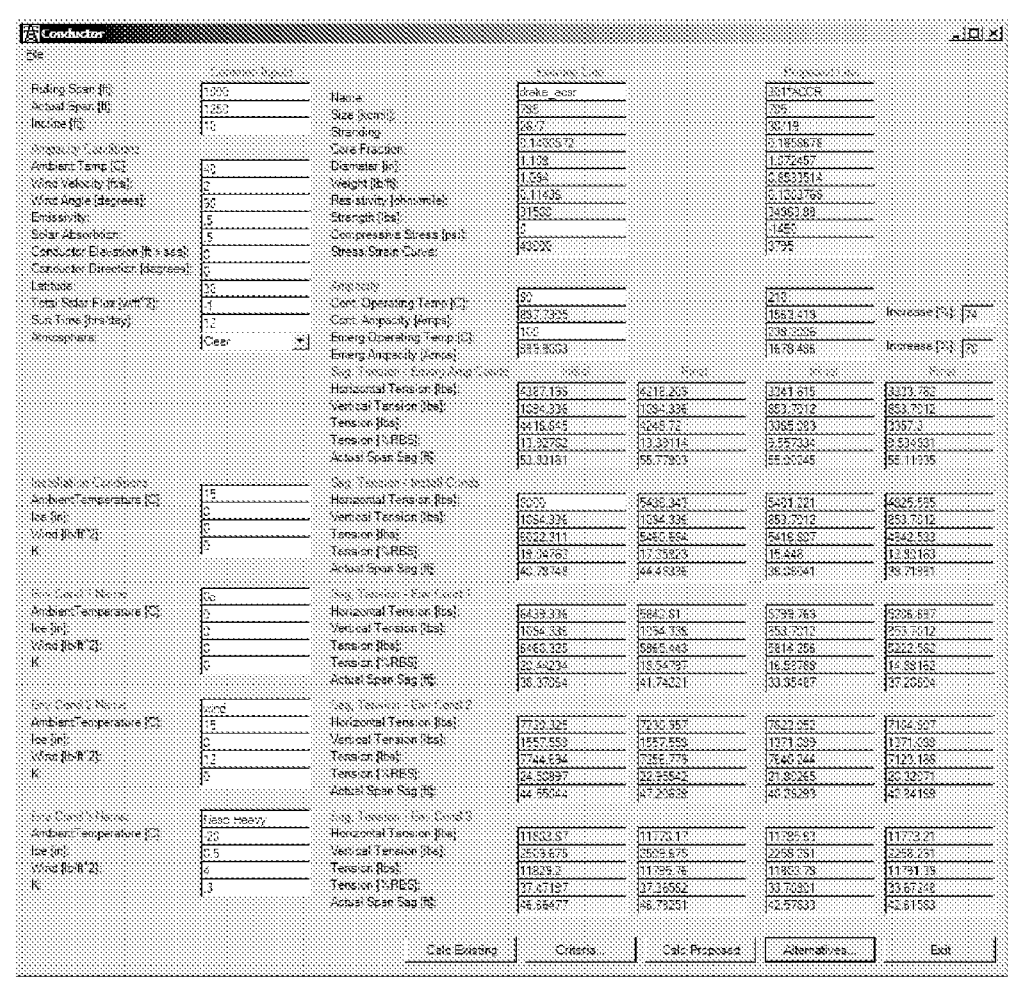

Conductor assessment system 14 then displays the conductor which provides the maximum ampacity within the utility customer's specified requirements (43). In this case, with the above inputs selected, conductor assessment system 14 determines that the best conductor is 348 ACCR. If utility company decides to install this conductor, they will attain a 72% increase in emergency ampacity as indicated by the program. Further, utility company will know that the proposed conductor can meet all specified sag and tension requirements. Utility customer will also know the installation tension that should be used. FIG. 20 shows this conductor, as selected and brought to the main screen.

Figure 5A:
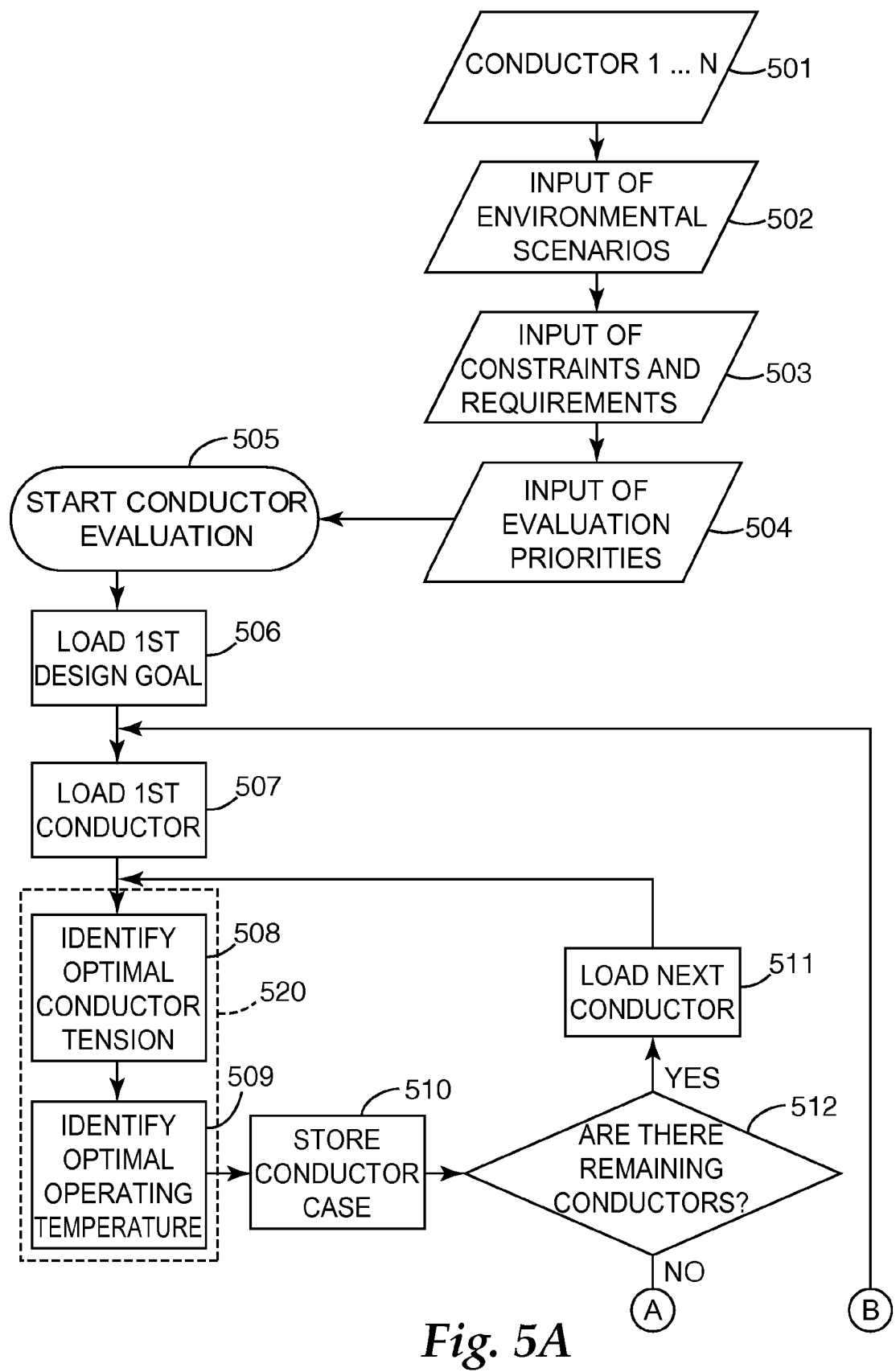
FIG. 5A and FIG. 5B together present a flowchart illustrating an exemplary manner in which conductors may be automatically or semi-automatically evaluated by the computerized conductor assessment system.
Figure 5B:
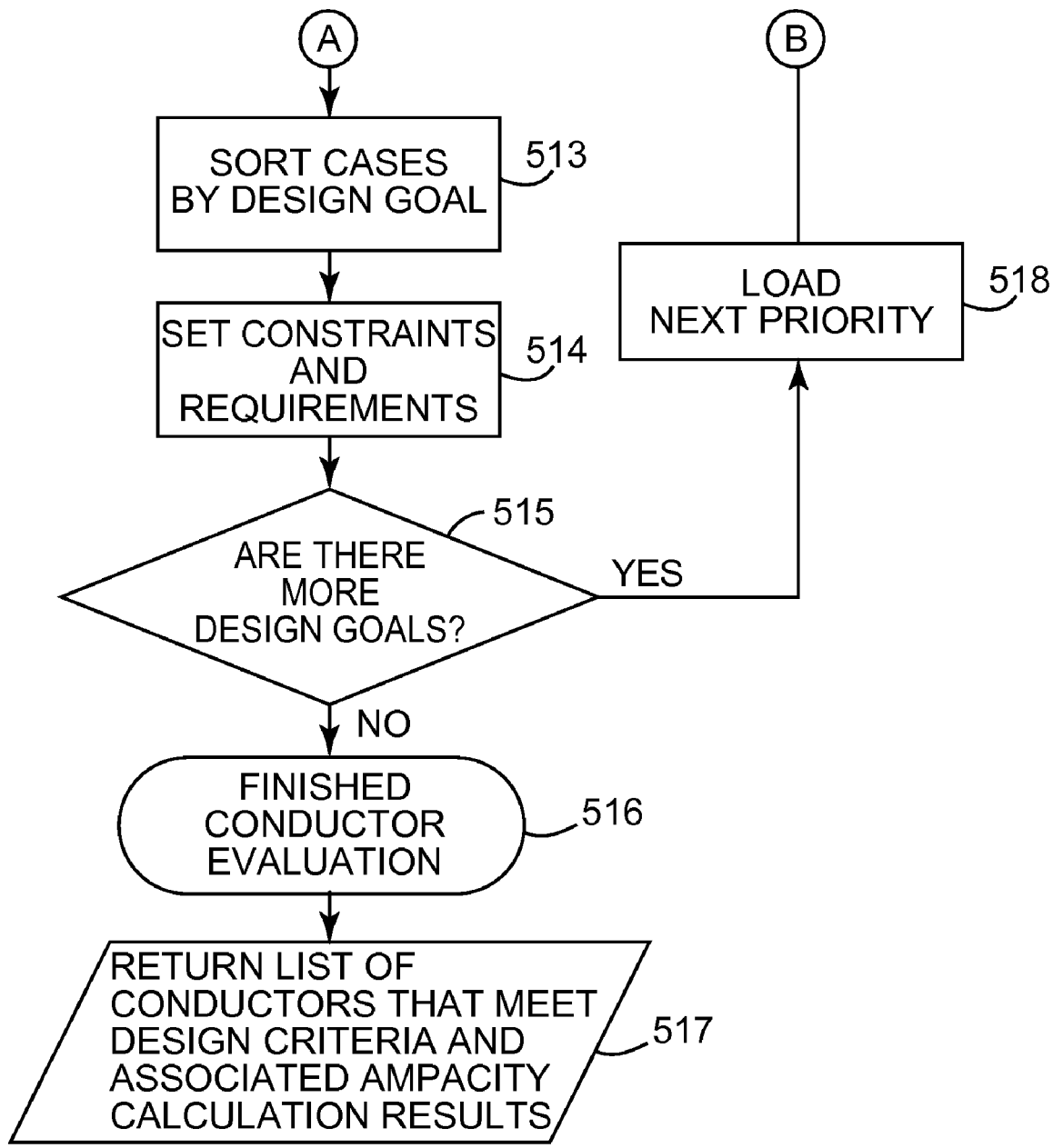

FIG. 5A and FIG. 5B together present a high level flowchart of an embodiment of a conductor assessment system. Particularly, FIG. 5A and FIG. 5B present an exemplary embodiment whereby expected operating performance of a conductor is modeled. FIG. 5A and FIG. 5B are connected by circled "A" and "B" notations on either figure. FIG. 5A and FIG. 5B have been and will be referred to herein, for clarity, as FIG. 5. Analysis starts with a set of conductors (501). These conductors, as described above, are placed in conductor database 21. In one embodiment, each conductor in conductor database 21 will be evaluated, so if user 10 wishes to exclude particular conductors from evaluation, they should not be loaded into conductor database 21. Next, the conductor assessment system receives input defining various environmental scenarios (502). Conductor assessment system then receives input defining power transmission line requirements and constraints (503). Next, the conductor assessment system 14 receives data defining evaluation priorities, otherwise termed design goals (504). Up to this point, the steps have already been described or eluded to in the context of describing the data inputs, with reference to the screen shots. Once data has been entered, the conductor evaluation procedure may begin (505). A first priority is loaded (506). A first conductor is loaded for evaluation (507). Next, a set of steps (identify optimal conductor tension (508) and identify optimal operating temperature (509)) are executed by one of two routines, which are explained further below. The two routines are "maximize ampacity/minimize area" and "minimize sag." Generally, each of these two routines will call sub-routines, or other routines, associated with identifying optimal conductor tension and identifying a conductor's optimal operating temperature, also described more fully below. The optimal tension and operating temperature values are saved (510), in one embodiment into the conductor database 21. Optimal operating temperature refers to either the temperature at which the conductor carries the most current, or the temperature at which the conductor sags least, given design constraints and weather conditions, depending on whether the program seeks to maximize ampacity or minimize sag. Optimal tension refers to the maximum allowable install tension given the design constraints and weather conditions. This tension is output from hunt tension for each conductor that meets the design requirements. In one embodiment, the optimal tension and operating values are saved in computer memory after being computed. A check is made as to whether there are more conductors (512); if there are more conductors, the next conductor is loaded (511) and the process repeats itself with the identify optimal conductor tension (508)/identify optimal operating temperature routines (509). If there are no more conductors to evaluate, the cases are sorted by the priority earlier loaded (see 506) (513). Automatic constraints/requirements for ampacity are then set (514). For example, if the program has completed the "maximize ampacity" design objective, then, for the purpose of evaluating a second design objective, the ampacity requirement will be set to maximum ampacity*(1-tolerance), where the tolerance on design objective 1 was set to 5% by the user, the ampacity requirement would be set to (2000*0.95)=1900). This automatic constraint overrides user 10's specification of required ampacity specified to conductor assessment system 14 earlier. The automatic constraint/requirement setting corresponds to the "set area constraint," "set sag constraint," or "set ampacity constraint" steps noted with respect to FIG. 6, below. If there are additional design goals (515), the next is loaded (518), and the conductors are again assessed. This outer loop repeats until there are no further design goals, at which point the conductor evaluation is complete (516). A listing of conductors that meet design criteria and associated ampacity calculation results is available for presentation to user 10 (517).

Figure 6:
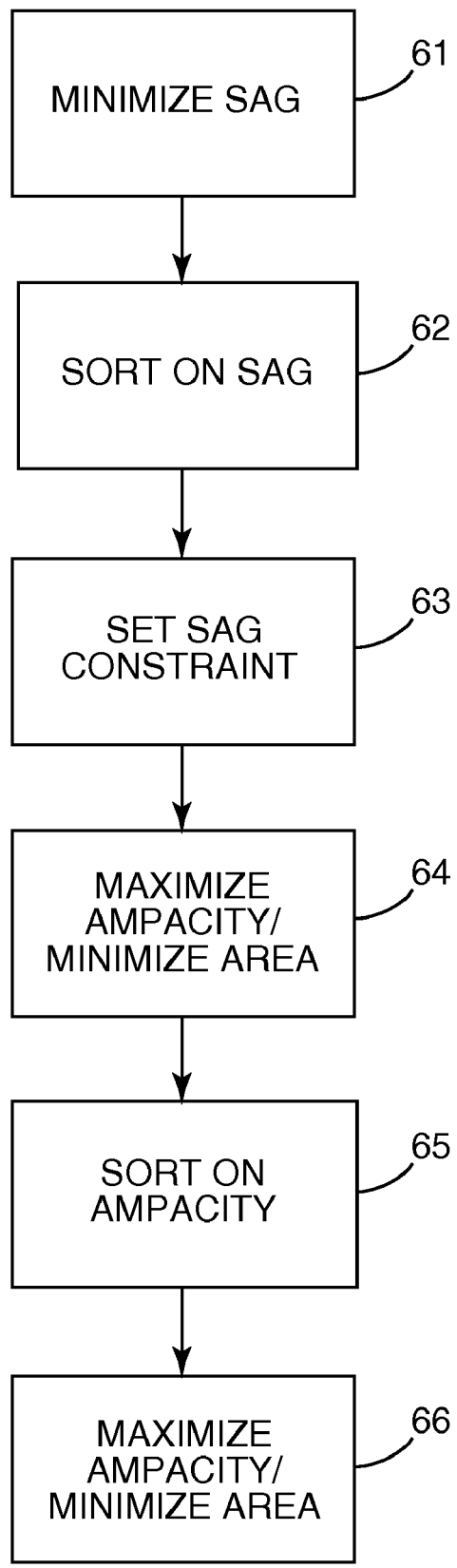
FIG. 6 is a flowchart illustrating the steps the software modules of the computerized conductor assessment system take in one exemplary embodiment, based on particular design goal priorities.

FIG. 6 is a flowchart showing an exemplary embodiment of the steps conductor optimizer engine 26 may take to evaluate a conductor when various design goals are specified by user 10. Particularly, FIG. 6 illustrates the high-level steps taken by conductor optimizer engine 26 when evaluating conductors after a user has set a first design goal of sag, and a second design goal of ampacity. As mentioned earlier, user 10 is, in one embodiment, able to specify, via user interface 13, a plurality of evaluation priorities conductor assessment system 14 will factor into its assessment of conductors. Evaluation priorities, in one embodiment, are selected by user 10 from a pre-defined pull-down menu. In this example, the conductors are evaluated and presented in a manner such that sag is the most important constraint, and ampacity is the second most important. In one embodiment, there are three evaluation priorities, and six permutations thereof, as specified in Table 3:

TABLE 3

| Case | First Priority | Second Priority | Third Priority |
|------|----------------|-----------------|----------------|
| 1 | Ampacity | Sag | Area |
| 2 | Ampacity | Area | Sag |
| 3 | Sag | Ampacity | Area |
| 4 | Sag | Area | Ampacity |
| 5 | Area | Ampacity | Sag |
| 6 | Area | Sag | Ampacity |

The design goals, or priorities, specified by user determine the case. Each case defines the manner in which conductor optimizer engine 26 will evaluate conductors. Each case invokes a common set of subroutines, but does so in different orders and frequencies. Table 4 shows various evaluation techniques conductor optimizer engine 26 will invoke based on the design goal case.

TABLE 4

| Case | Basic Steps in Subroutine |
|------|---------------------------|
| 1 | Maximize Ampacity/Minimize Area |
|   | Sort on ampacity |
|   | Set ampacity constraint |
|   | Minimize sag |
|   | Sort on sag |
|   | Set sag constraint |
|   | Maximize ampacity/Minimize Area |
| 2 | Maximize Ampacity/Minimize Area |
|   | Sort on ampacity |
|   | Set ampacity constraint |
|   | Maximize Ampacity/Minimize Area |
|   | Sort on area |
|   | Set area constraint |
|   | Minimize Sag |
| 3 | Minimize Sag |
|   | Sort on sag |
|   | Set sag constraint |
|   | Maximize Ampacity/Minimize Area |
|   | Sort on ampacity |
|   | Set ampacity constraint |
|   | Maximize Ampacity/Minimize Area |
| 4 | Minimize Sag |
|   | Sort on Sag |
|   | Set sag constraint |
|   | Maximize Ampacity/Minimize Area |
|   | Sort on area |
|   | Set area constraint |
|   | Maximize Ampacity/Minimize Area |
| 5 | Maximize Ampacity/Minimize Area |
|   | Sort on area |
|   | Set area constraint |
|   | Maximize Ampacity/Minimize Area |
|   | Sort on ampacity |
|   | Set ampacity constraint |
|   | Minimize Sag |
| 6 | Maximize Ampacity/Minimize Area |
|   | Sort on area |
|   | Set area constraint |
|   | Minimize Sag |
|   | Sort on sag |
|   | Set sag constraint |
|   | Maximize Ampacity/Minimize Area |

In one embodiment, each case implements the same set of routines, but in different orders or frequencies. FIG. 6, then, is an exemplary process flow conductor assessment system 14 could take if case three were specified by user 10. This example was chosen only because it uses all routines or subroutines and calls each one only once. The process of evaluating conductors starts after a set of conductors have been identified which will be evaluated. This set of conductors is, in one embodiment, the conductors described in conductor database 21. This set of conductors, before any have been eliminated from consideration by conductor assessment system 14, the initial conductor set.

First, a minimize sag operation is conducted on the initial conductor set (61). One embodiment of this routine is shown in FIG. 8.

Returning to FIG. 6, the minimize sag routine (61) returns a subset of conductors that thus far meet user 10's power transmission line requirements, and for each conductor that conductor's minimum sag, emergency operating temperature, and optimal install tension. The minimize sag routine is discussed below with respect to FIG. 8. Next, the sort on sag routine sorts this subset of conductors by ascending sag value (62). Next, the sag constraint for the conductors is set to the least sag value of all conductors plus the allowed tolerance (63). The allowed tolerance is the Priority 1 Tolerance set by the user in the design goals area. In one embodiment, the subset of conductors that have not been eliminated from consideration are passed to a maximize ampacity/minimize area routine. In another embodiment, all of the conductors in the database are re-evaluated, rather than subset, with the new automatically set constraint. This is described with respect to FIG. 7 below. The maximize ampacity/minimize area routine either eliminates a given conductor from further consideration or returns the conductor, its optimal install tension and operating temperature, and its ampacity and area (for sorting purposes). Next, the subset of conductors is sorted by ampacity in descending order (65). The ampacity requirement will be set to the highest value identified minus the allowed tolerance. Finally, the subset of conductors that have not been eliminated are passed to the same maximum ampacity/minimize area routine discussed with respect to FIG. 7 below, where the conductor may again be eliminated. At this point the conductor or conductors with sag values within the allowed tolerance of minimum sag, and ampacity values within the allowed tolerance of maximum ampacity, and with the least core area have been identified by the system. The conductors not eliminated at this point meet all of user 10's power transmission line requirements. User 10's design goals were factored in by multiple iterations as explained with respect to FIG. 5.

Figure 7:
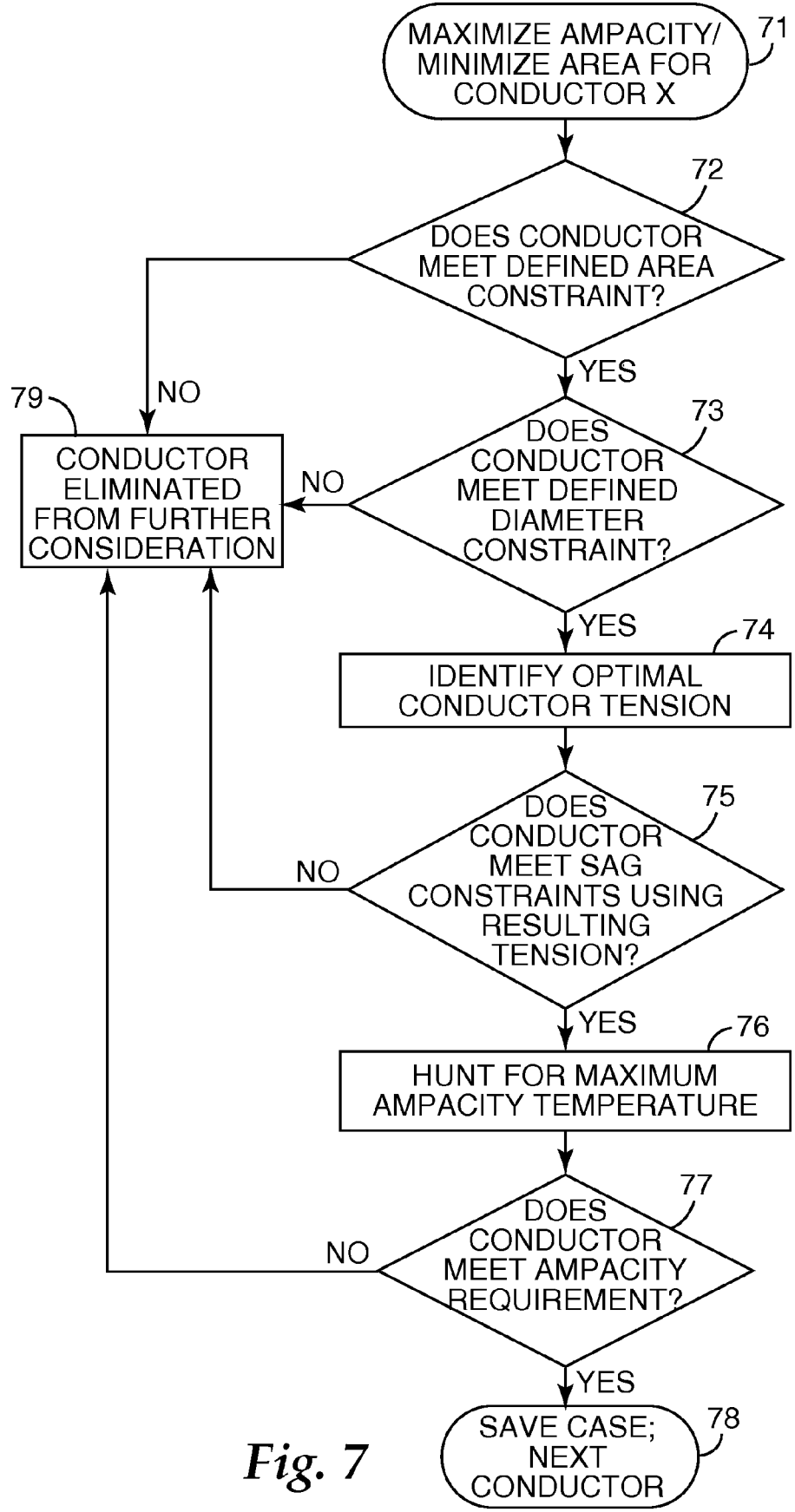
FIG. 7 is a flowchart illustrating a high level view of an exemplary manner in which an embodiment of the computerized conductor assessment system may evaluate and model conductors.

FIG. 7 is a flowchart illustrating one exemplary embodiment of a maximize ampacity/minimize area routine performed by conductor assessment system 14 when automatically or semi-automatically evaluating a conductor. In one embodiment, data defining a conductor is passed to the routine (71). The conductor's area is checked against the programmatically set area constraint (72). If the constraint is not met, the conductor is eliminated from further consideration (79). If the conductor constraint is met, the conductor's diameter is checked against user 10's defined diameter constraint (73). If the conductor's diameter does not meet the diameter constraint, the conductor is eliminated from further consideration (79). If conductor's diameter does meet the diameter constraint, the conductor is passed to the "identify optimal conductor tension" routine, an embodiment of which is described below with respect to FIG. 9. The conductor's sag is then checked using the optimal tension value for the conductor returned from "identify optimal conductor tension" routine (75). If the conductor does not meet the sag constraints which may be defined by user 10 as the part of the power transmission line requirements or programmatically set by conductor assessment system 14, the conductor is eliminated from further consideration (79). If the conductor does meet the sag constraints defined by user 10 as part of the power transmission line requirements, the conductor is passed to the "hunt for maximum ampacity temperature" routine, which is described below with respect to FIG. 10 (76). The conductor's ampacity is then calculated using the maximum ampacity temperature, and checked against the requirement (77), which may be set by user 10 or programmatically set by the system. If the requirement is not met, the conductor is eliminated from further consideration (79). If the requirement is met, the conductor is saved along with its optimal install tension and emergency operating temperature.

Figure 8:
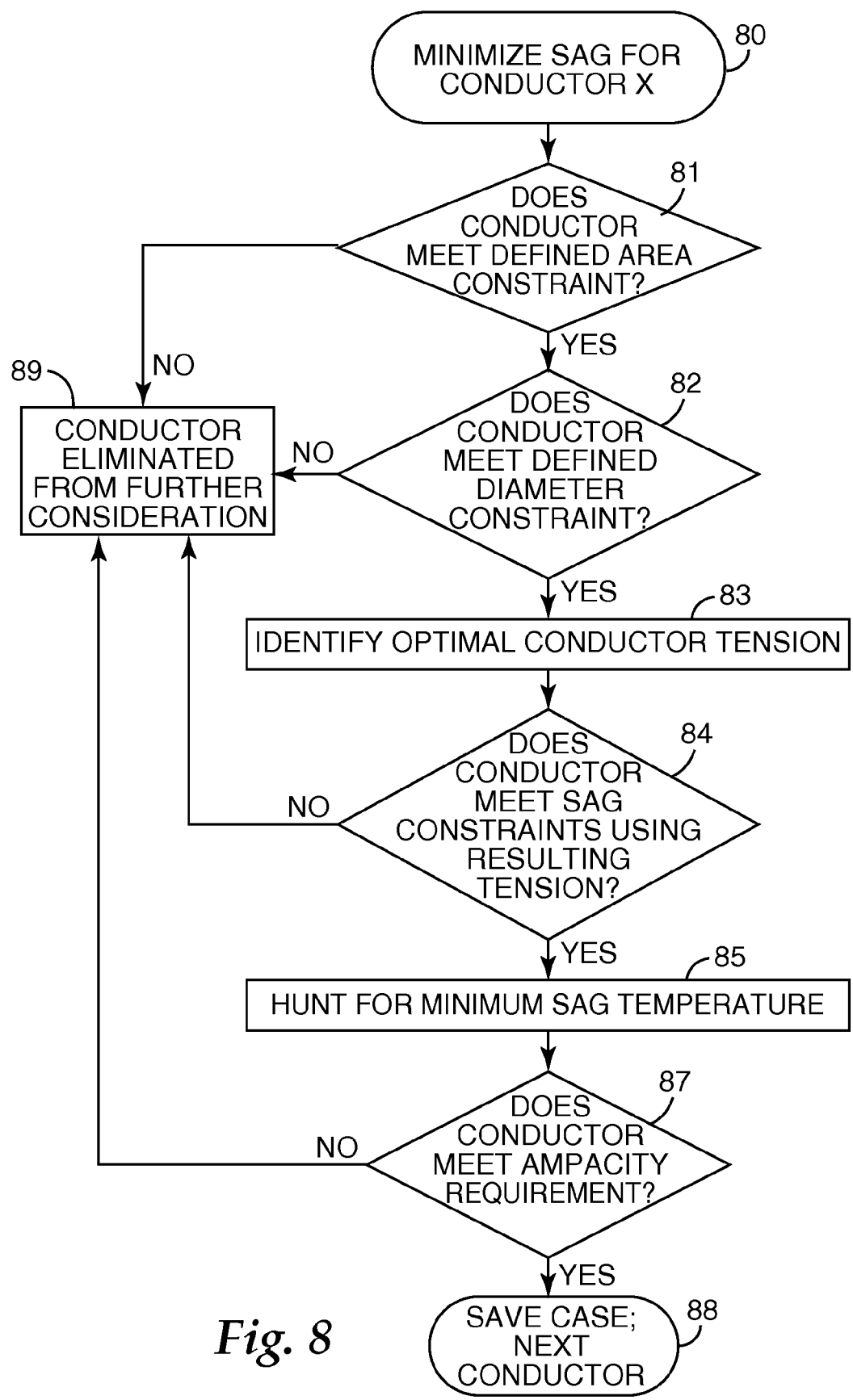
FIG. 8 is a flowchart illustrating a "minimize sag" routine.
Figure 9:
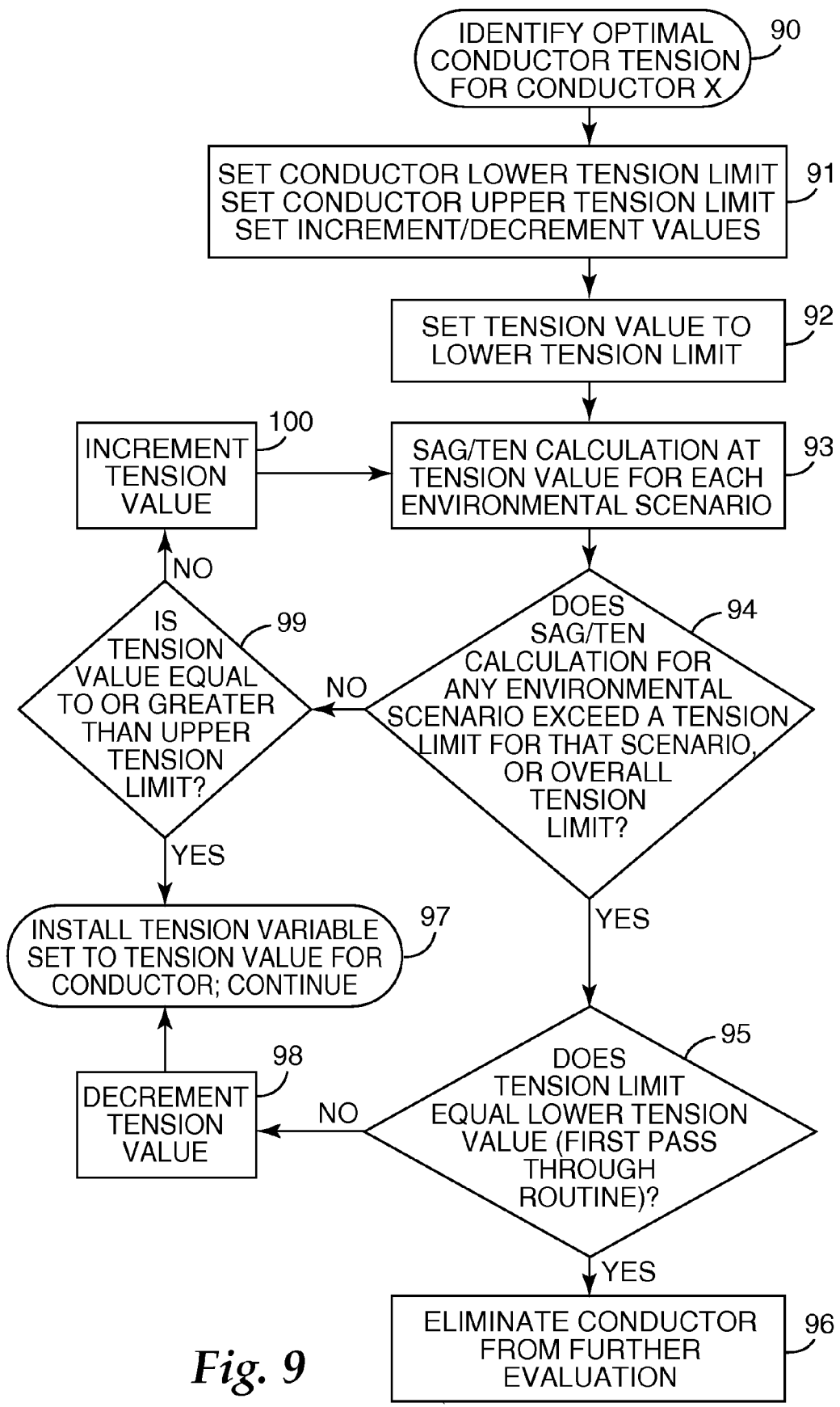
FIG. 9 is a flowchart illustrating a "identify optimal conductor tension" routine.
Figure 11:
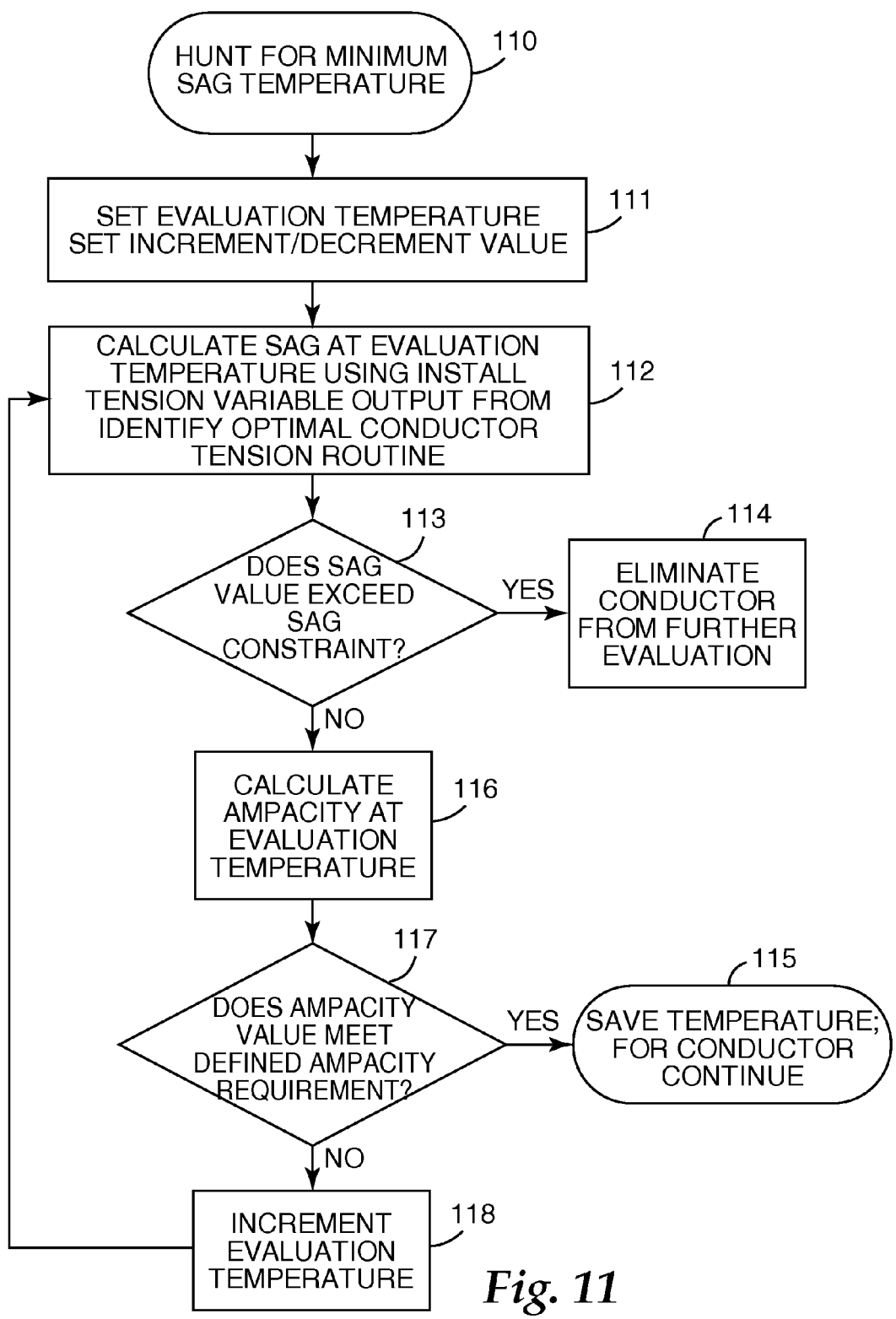
FIG. 11 is a flowchart illustrating a "hunt for minimum sag temperature" routine.

FIG. 8 is a flowchart illustrating an exemplary embodiment of a minimize sag routine performed by conductor assessment system 14 when automatically evaluating a conductor. The process evaluates conductor and determines whether the conductor meets a defined area constraint (81). If the conductor does not meet the area constraint, it is eliminated from further consideration (89). If it does meet the conductor area constraint, the minimize sag routine then determines if the conductor meets the defined diameter constraint (82). If not, the conductor is similarly eliminated from further consideration (89). If the conductor does meet the diameter constraint (82), data defining the conductor being evaluated is passed to routine "identify optimal conductor tension" (83), which, in one embodiment, is illustrated in FIG. 9, and is discussed below. The "identify optimal conductor tension" routine analyzes a conductor and either eliminates the conductor from consideration or returns the conductor's optimal install tension value. If the conductor is not eliminated from further consideration, the sag value is then calculated using the conductor's optimal tension value, then compared with the constraint value for sag defined in the power transmission line requirements (84), or set programmatically. If the sag value meets the constraint value, data defining the conductor is passed to the "hunt for minimum sag temperature routine" (85), an embodiment of which is illustrated in FIG. 11 and discussed below. The "hunt for minimum sag temperature routine" analyzes a conductor and returns a temperature at which sag is minimized ("minimum sag temperature"), or eliminates the conductor from further consideration if the minimum emergency operating sag temperature exceeds the maximum sag value specified by user 10. The conductor's ampacity is then calculated (87). If the conductor's ampacity does not meet ampacity requirements, the conductor is eliminated from further consideration (89). If the conductor does meet the ampacity requirement (88), in one embodiment the conductor case is saved in conductor database 21 or returned, along with the minimum sag temperature and the optimal tension values. In another embodiment, the conductor case is saved in computer memory.

FIG. 9 shows an embodiment of the "identify optimal conductor tension routine performed by conductor assessment system 14 when automatically evaluating a conductor. The routine is passed data defining a single conductor (90). Various control variables are then set (91). Particularly, the conductor's lower and upper tension limits are set, and the increment/decrement value is set, for a respective environmental scenario. The conductor's lower tension limit is set at 7% of breaking strength. The conductor's upper tension limit is 40% of breaking strength. These values could otherwise defined if necessary. The increment/decrement value is a small value: in one embodiment it is the upper tension limit minus the lower tension limit divided by 500. The tension value variable ("TEN") is set to be the lower tension limit (92). A sag/tension calculation is then executed for each environmental scenario, including install (93). The resulting sag/tension calculations are then analyzed to see if any of them exceed overall upper tension limit, or a tension limit associated with any environmental scenario (94). If the sag/tension calculation for all environmental scenarios do not exceed the upper tension value for each particular environmental scenario, or the overall tension limits, TEN is compared to the conductor's upper tension limit (99), and if equal, the conductor's install tension variable is determined and the value is placed, in one embodiment, in conductor data 21, or passed back to the calling routine. If the TEN does not equal conductor's upper tension limit, TEN is incremented (100) by the increment/decrement value and the sag/tension values are calculated again using the newly incremented TEN (93).

If, however, the sag/tension calculation for any of the environmental scenarios does exceed the overall upper tension limit, or the tension limit for an environmental scenario (94), a check is done to determine whether TEN equals the lower tension value (95). If the two are equal, the conductor failed on its first pass through routine, and the conductor is eliminated from further evaluation (96). If TEN does not equal the conductor's lower tension limit, the tension value is decremented (98), thus restoring the tension value to the last tension value between the upper and lower tension limits, and the tension variable for the conductor is placed, in one embodiment, in conductor data 21, or passed back to the calling routine (97).

Figure 10:
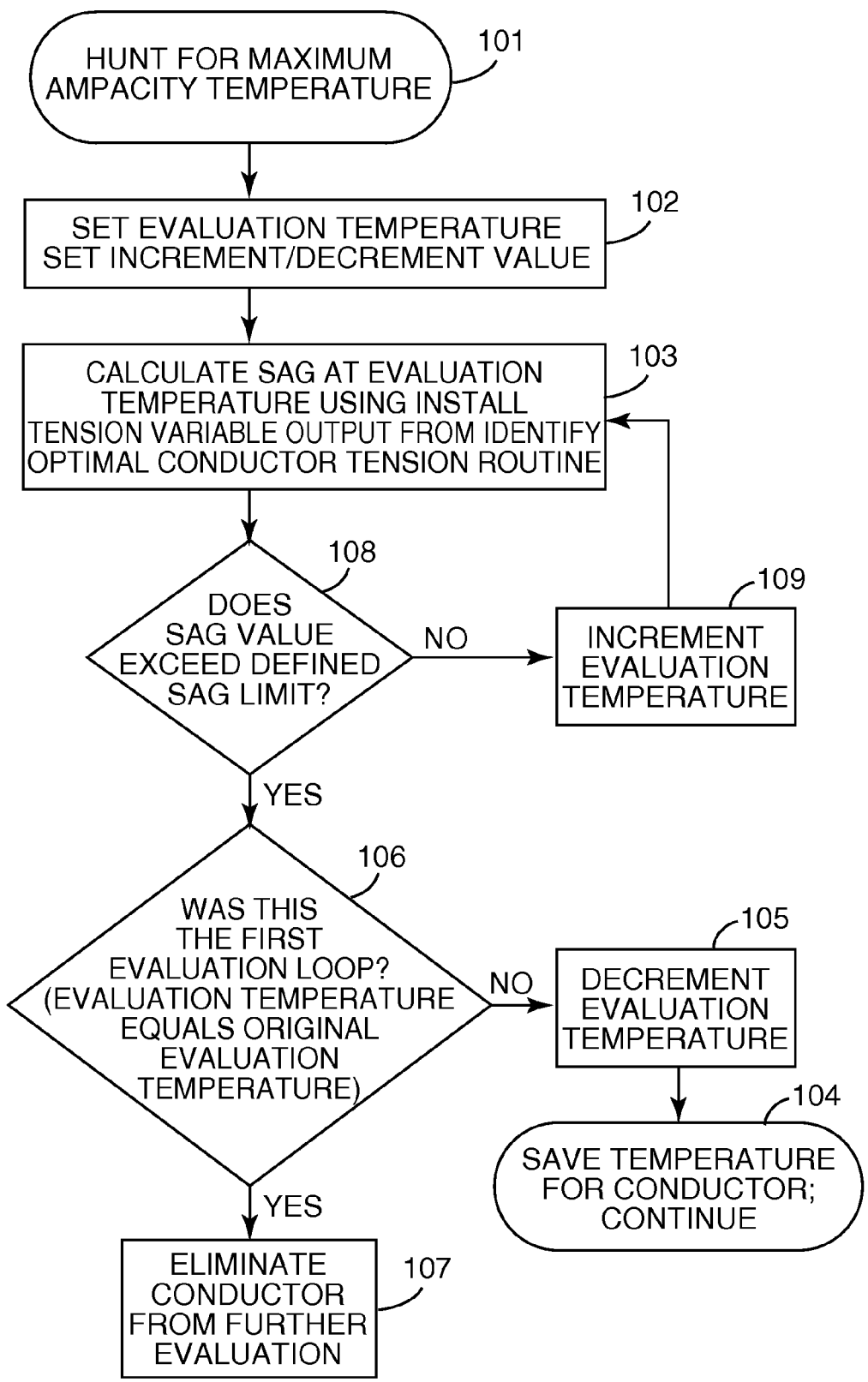
FIG. 10 is a flowchart illustrating a "hunt for maximum ampacity" routine.

FIG. 10 is a flowchart illustrating an exemplary embodiment of a "hunt for maximum ampacity temperature" routine performed by conductor assessment system 14 when automatically evaluating a conductor. Data defining a conductor is passed to the routine (101). Two variables are set: evaluation temperature and increment/decrement value (102). The routine sets an initial evaluation temperature, which is the lower limit defined specified for the conductor family, as may be input with respect to FIG. 14's default conductor family modification area 1304, particularly the data in the column entitled "lower"). An increment/decrement value is also defined, which just is a relatively small value. In one embodiment, the increment value is maximum temperature less the minimum temperature divided by 200 (both maximum and minimum temperatures as defined for the conductor's family, as illustrated in FIG. 14's default conductor family modification area 1304—minimum or maximum being respective to any value for a family in the columns entitled lower, continuous, or emergency). This increment value is termed the temperature tolerance percentage. The same basic value with respect to a tension increment is termed the tension tolerance percentage. The conductor's sag is then calculated at the evaluation temperature using the optimal tension variable as determined in the "identify optimal conductor tension" routine. The sag value is checked against user 10's defined sag constraint (108). If the value does not exceed the constraint, the evaluation temperature is incremented by the increment value (109) and the sag value again calculated (103). If the sag value does exceed the defined sag limit (108), a check is made as to whether the evaluation temperature equals the original temperature (106). This check is just a way to determine whether there were any evaluation temperatures that produced a sag value within the limits for that conductor, using the optimal conductor tension value. If there were none (failure first time through the routine), the conductor is eliminated from further consideration (107). If it is not the first time through the routine, the evaluation temperature is decremented (105) by the decrement value, thus restoring the value to the last known value that produced a sag value that met the user 10's sag limit. The maximum ampacity temperature for the conductor is saved in conductor database 21, returned to the calling routine, or saved in computer memory (104).

FIG. 11 shows an embodiment of "hunt for minimum sag temperature" routine performed by conductor assessment system 14 when automatically evaluating a conductor. The routine is passed data defining a single conductor (110). The routine sets an initial evaluation temperature, which is the lower limit defined specified for the conductor family, as may be input with respect to FIG. 14's default conductor family modification area 1304, particularly the data in the column entitled "lower" (111). An increment value is also defined, which just is a relatively small value (111). In one embodiment, the increment value is maximum temperature less the minimum temperature divided by 200 (both maximum and minimum temperatures as defined for the conductor's family, as illustrated in FIG. 14's default conductor family modification area 1304—minimum or maximum being respective to any value for a family in the columns entitled lower, continuous, or emergency). The conductor's sag is then calculated at the evaluation temperature using the optimal tension variable as determined in the "identify optimal conductor tension" routine. The sag value is checked against user 10's defined sag constraint (112). If the sag value exceeds the defined sag limit (113), the conductor is eliminated from further consideration (114). If the sag value does not exceed the sag constraint, the conductor's ampacity is calculated at the evaluation temperature (116). The ampacity value is then checked against the ampacity requirement. If the ampacity requirement is not met, the evaluation temperature is incremented by the increment amount (118) and the sag value again calculated. If the ampacity value for the conductor does meet the defined ampacity requirement, the temperature at which this became true is saved to conductor database 21, returned to the calling routine, or saved in computer memory.

Figure 12:
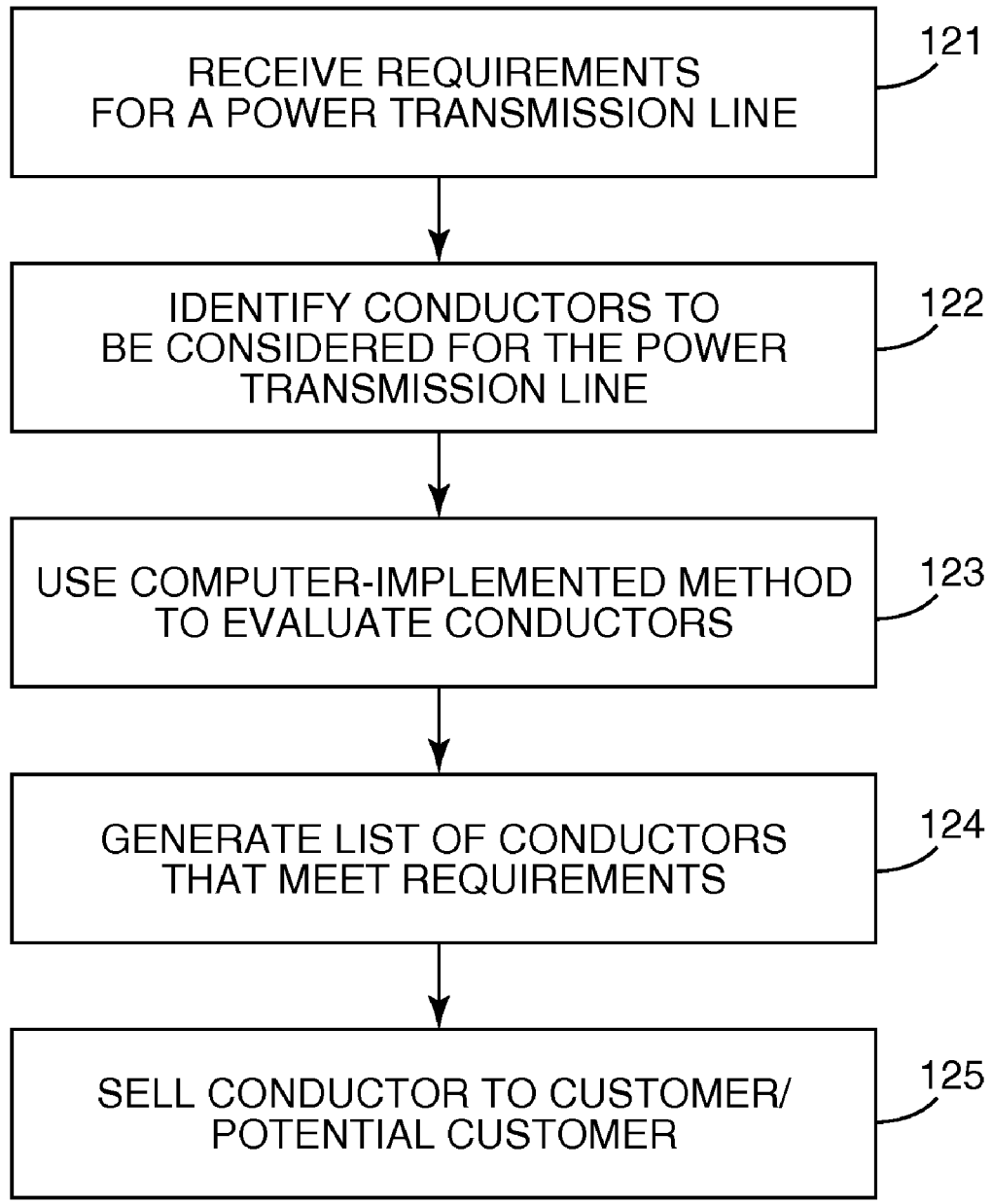
FIG. 12 is a flowchart illustrating various process steps utilizing exemplary embodiments of the computerized conductor assessment system to propose and sell conductors to customers or potential customers.

FIG. 12 is a flowchart illustrating various process steps utilizing various embodiments of conductor assessment system 14 to propose and sell conductors to customers or potential customers. For example, user 10 could receive requirements for an electric line (121). This could be done by interviewing a customer or potential customer to understand what the customer is using, then using the existing conductor as a basis for requirements. Alternatively, the requirements for a power transmission line could simply be requested by user 10 and provided by a customer, potential customer, or interested party. User 10 next specifies a set of conductors that should be evaluated for best meeting the requirements for the power transmission line (122). In some embodiments, this could by default be all known conductors. For various reasons, however, user 10 or the customer, potential customer, or $3^{rd}$ party may be interested in narrowing the population of available conductors to be analyzed. In one embodiment, a set of design goals could also be specified at this point. Next, user 10 uses a computer-implemented method or computer system to model performance of each conductor and determine whether the conductor meets requirements. One such computer-implemented method is described above. The computer system then generates a list of conductors that meet the power transmission line requirements (124). This list, or the information that is a basis for the list, could then be either shared with the customer or potential customer or $3^{rd}$ party, or discussed. User 10 could then sell the conductor to the customer or potential customer (125).

Figure 21:
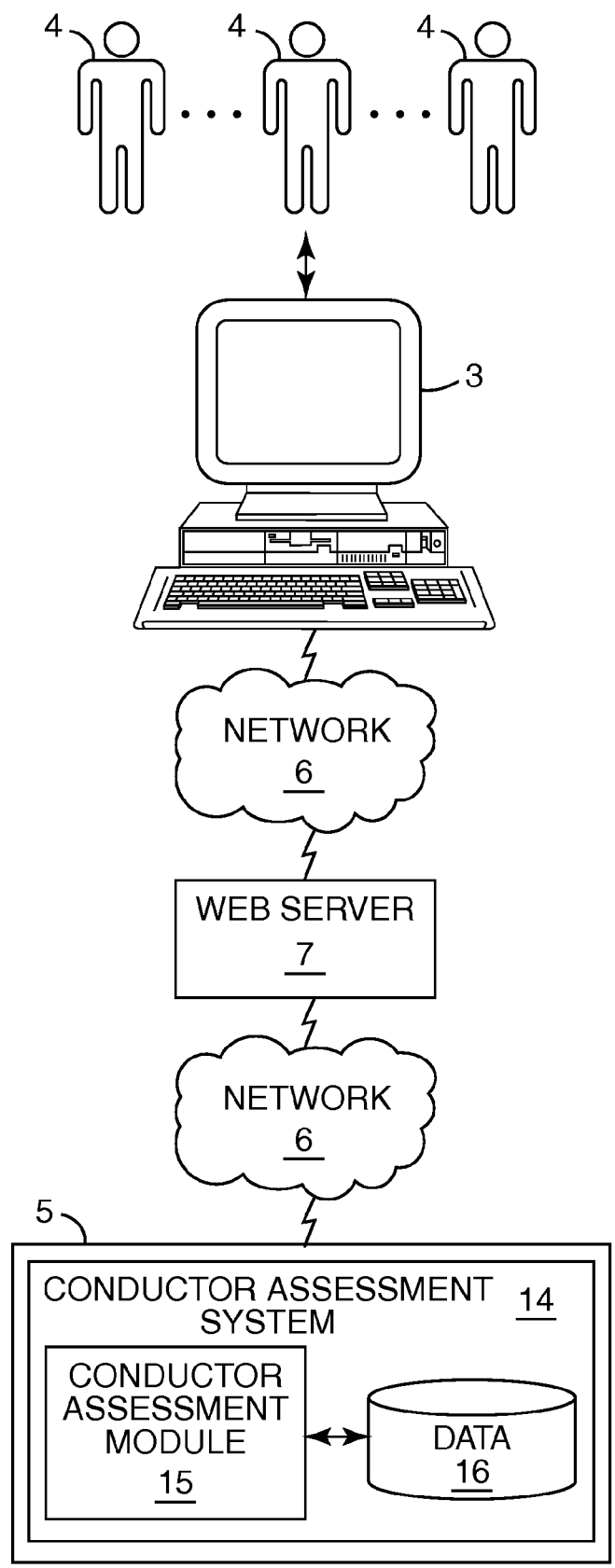
FIG. 21 is a diagram illustrating one example manner in which conductor assessment system may be implemented.

FIG. 21 is a further exemplary embodiment of a manner in which conductor assessment system 14 could be implemented. Particularly, FIG. 20 shows a client/web server/application server environment where a user is not required to help a customer, potential customer, or other $3^{rd}$ parties evaluate conductors. Customers or potential customers 4 interact with computing device 3, and connect to a web server 7 via network 6, which could be the Internet. Web server 7 could be, one such as that marketed by Microsoft Corporation under the trade designation "INTERNET INFORMATION SERVER." It could also be a web server such as that marketed by Apache Foundation under the trade designation "APACHE WEB SERVER." In this example embodiment shown in FIG. 21, web server 7 provides user interface components that facilitates gathering and presenting information similar to that as was described with respect to user interface 13. Web server 7 may be attached, via a network such as network 6, to application server 5, which hosts an implementation of conductor assessment system 14. In another embodiment, web server 7 and application server 5 are on the same system. In another embodiment, data 16 is on a separate server, attached to application server 5 via a network.

Various implementations and embodiments of the invention have been described. Nevertheless, it is understood that various modifications can be made without departing from the invention. Particularly, one skilled in the art will recognize myriad ways that a system could be implemented that accomplishes substantially that which is described above. Accordingly, these and other embodiments are within the scope of the following claims.

The invention claimed is:

1. A computer-implemented method of evaluating an electric conductor for an overhead power transmission line, comprising:
   receiving requirements data defining requirements for an overhead power transmission line comprising at least a span value, a maximum sag value, and a maximum tension value;
   receiving conductor data that define at least two conductors to be evaluated;
   after receiving conductor data for the plurality of conductors to be evaluated, automatically modeling expected operating performance for at least two conductors using conductor assessment software running on a computer, wherein modeling at least comprises, for at least one of the conductors to be evaluated, calculating the conductor's maximum ampacity within the constraints defined by the requirements data; and,
   based on the modeling, identifying at least one conductor that meets the requirements for the power transmission line using the conductor assessment software.

2. The computer-implemented method of claim 1, additionally comprising:
   generating, with the conductor assessment software, an electronic report containing at least one conductor that meets the requirements for the power transmission line.

3. The computer-implemented method of claim 1, additionally comprising:
   after modeling at least two conductors, sorting the conductors by core area.

4. The computer-implemented method of claim 3, wherein identifying comprises determining the conductor with the smallest core area that meets the requirements.

5. The computer-implemented method of claim 1, wherein modeling expected operating performance comprises automatically iterating through at least one calculation for at least two conductors, the automatic iteration executed by the conductor assessment software.

6. The computer-implemented method of claim 1, wherein identifying at least one conductor that meets the requirements for the power transmission line comprises identifying one or more conductors that do not meet the requirements for the power transmission line.

7. The computer-implemented method of claim 1, wherein maximum tension is horizontal tension at sag, average tension, vertical tension (a tension at the attachments), a tension value expressed as the percentage breaking strength of the conductor, the vertical component of the tension at attachments, or the transverse component of the tension at the attachments.

8. The computer-implemented method of claim 1, wherein span value is an actual span or ruling span.

9. The computer-implemented method of claim 1, wherein operating performance comprises sag/tension or ampacity.

10. The computer-implemented method of claim 1, wherein modeling comprises modeling least one real, non-theoretical conductor.

11. The computer-implemented method of claim 1, wherein receiving requirements data comprises receiving requirements for an overhead electric distribution line.

12. The computer-implemented method of claim 1, wherein requirements data is data that defines an existing overhead power transmission line.

13. The computer-implemented method of claim 1, wherein the conductor data includes at least one of the following data elements:
   strength of conductor;
   weight of conductor;
   heat capacity of conductor;
   type or family of conductor,
   stress strain curve data of conductor; or
   diameter of conductor.

14. A computer-implemented method of evaluating an electric conductor for an overhead power transmission line, comprising:
   receiving requirements data defining requirements for an overhead power transmission line comprising at least a span value, minimum ampacity, and a maximum tension value;
   receiving conductor data that define at least two conductors to be evaluated;
   after receiving conductor data for the plurality of conductors to be evaluated, automatically modeling expected operating performance for at least two conductors using conductor assessment software running on a computer, wherein modeling at least comprises, for at least one of the conductors to be evaluated, calculating the conductor's minimum sag within the constraints defined by the requirements data; and,
   based on the modeling, identifying at least one conductor that meets the requirements for the power transmission line using the conductor assessment software.

15. The computer-implemented method of claim 14, additionally comprising:
   generating, with the conductor assessment software, an electronic report containing at least one conductor that meets the requirements for the power transmission line.

16. The computer-implemented method of claim 14, additionally comprising:
   after modeling at least two conductors, sorting the conductors by core area.

17. The computer-implemented method of claim 14, wherein identifying comprises determining the conductor with the smallest core area that meets the requirements.

18. The computer-implemented method of claim 14, wherein modeling expected operating performance comprises automatically iterating through at least one calculation for at least two conductors, the automatic iteration executed by the conductor assessment software.

19. The computer-implemented method of claim 14, wherein identifying at least one conductor that meets the requirements for the power transmission line comprises identifying one or more conductors that do not meet the requirements for the power transmission line.

20. The computer-implemented method of claim 14, wherein maximum tension is horizontal tension at sag, average tension, vertical tension (a tension at the attachments), a tension value expressed as the percentage breaking strength of the conductor, the vertical component of the tension at attachments, or the transverse component of the tension at the attachments.

21. The computer-implemented method of claim 14, wherein span value is an actual span or ruling span.

22. The computer-implemented method of claim 14, wherein modeling comprises modeling least one real, non-theoretical conductor.

23. The computer-implemented method of claim 14, wherein the conductor data includes at least one of the following data elements:
   strength of conductor;

weight of conductor;
heat capacity of conductor;
type or family of conductor,
stress strain curve data of conductor; or
diameter of conductor.

24. A computer-implemented method of evaluating an electric conductor for an overhead power transmission line, comprising:
receiving power transmission line data that defines an existing power transmission line;
receiving a set of requirements data defining requirements for a replacement conductor from a user, at least one limitation of which is proposed by the conductor assessment software, and based on a limitation of the existing power transmission line;
receiving conductor data that define at least two conductors to be evaluated;
after receiving conductor data for the plurality of conductors to be evaluated, automatically modeling expected operating performance for at least two conductors using conductor assessment software running on a computer; and,
based on the modeling, identifying at least one conductor that meets the requirements for the power transmission line using the conductor assessment software.

25. The computer-implemented method of claim 24, wherein automatically modeling expected operating performance comprises:
calculating the conductor's optimal tension, wherein the optimal tension is a tension value within a tension tolerance percentage value of the highest tension value yielding a sag/tension calculation that does not exceed the maximum tension value, defined as part of the power transmission line requirements or the conductor data; and
calculating the conductor's optimal operating temperature, wherein the optimal operating temperature is within a temperature tolerance percentage value of the temperature which yields a sag value greater than a maximum sag value defined as part of the power transmission line requirements.

26. The computer-implemented method of claim 25, wherein automatically modeling expected operating performance of each conductor further comprises:
sorting conductors by a design goal, wherein the design goal is one of the following:
maximize ampacity;
minimize sag; or
minimize core area.

27. A computer-implemented method of evaluating an electric conductor for an overhead power transmission line, comprising:
receiving requirements data that define at least two requirements for an overhead power transmission line;
receiving conductor data that define at least two conductors to be evaluated;
receiving preference data that defines at least one design goal, wherein the design goal defines both "a" and "b" as follows:

(a) a design goal variable, which is any variable that is among the requirements data, among the conductor data, among both the requirements data and the conductor data, or is the result of a calculation that involves data that is either among the requirements data or the conductor data,
(b) for the design goal variable, preference data defining whether the variable should be maximized or minimized;
after receiving requirements data, conductor data, and preference data, for the plurality of conductors to be evaluated, automatically modeling expected operating performance for at least two conductors using conductor assessment software running on a computer; and,
based on the modeling, identifying at least one conductor that meets the requirements for the power transmission line, and either maximizes or minimizes the design goal variable as defined by the preference data using the conductor assessment software.

28. The computer-implemented method of claim 27, wherein the design goal variable is at least one of the following:
ampacity of the power transmission line;
sag of the power transmission line; or
core area of the conductor.

29. A system for identifying conductors that meet requirements for an overhead power transmission line, comprising:
a database component operative to maintain a database identifying at least two conductors;
a user interface component operative to receive information defining requirements for an overhead power transmission line, the requirements at least comprising a span value, a maximum sag value, and a maximum tension value;
a modeling component operative to computationally evaluate the performance of at least two of the conductors maintained in the database component, wherein computational evaluation comprises calculating a conductor's maximum ampacity with the constraints defined by the requirements data; and
a reporting component operative to determine and present, based on the modeling component's evaluation, conductors that meet requirements for the overhead power transmission line.

30. A method of selling a conductor an overhead power transmission line comprising:
receiving requirements for an overhead power transmission line;
identifying a set of conductors that could meet the requirements of a power transmission line, at least one of the conductors from a manufacturer distinct from a manufacturer of another of the conductors;
using a computer-implemented method to automatically model performance of at least two of the conductors against requirements of the power transmission line;
generating a list of conductors that meet the requirements; and
selling a conductor from the list of conductors that meet the requirements.

* * * * *